(12) United States Patent
Newton et al.

(10) Patent No.: US 10,364,136 B2
(45) Date of Patent: Jul. 30, 2019

(54) VALVE DEVICE

(71) Applicants: John Newton, Vero Beach, FL (US); Peter Brooke, Micco, FL (US); Dustin Hartsfield, Sebastian, FL (US); Michael Cheney, Vero Beach, FL (US); Gillian Callaghan, Vero Beach, FL (US); Scott Ross, Sebastian, FL (US)

(72) Inventors: John Newton, Vero Beach, FL (US); Peter Brooke, Micco, FL (US); Dustin Hartsfield, Sebastian, FL (US); Michael Cheney, Vero Beach, FL (US); Gillian Callaghan, Vero Beach, FL (US); Scott Ross, Sebastian, FL (US)

(73) Assignee: GATE CFV SOLUTIONS, INC., Sebastian, FL (US)

(*) Notice: Subject to any disclaimer, the term of this patent is extended or adjusted under 35 U.S.C. 154(b) by 0 days.

(21) Appl. No.: 15/836,839

(22) Filed: Dec. 9, 2017

(65) Prior Publication Data

US 2018/0099851 A1  Apr. 12, 2018

Related U.S. Application Data

(63) Continuation-in-part of application No. 15/714,447, filed on Sep. 25, 2017.

(Continued)

(51) Int. Cl.
*B67D 1/00* (2006.01)
*B67D 1/12* (2006.01)
(Continued)

(52) U.S. Cl.
CPC ........ *B67D 1/0085* (2013.01); *B67D 1/0021* (2013.01); *B67D 1/0034* (2013.01); *B67D 1/0075* (2013.01); *B67D 1/0081* (2013.01); *B67D 1/1252* (2013.01); *B67D 1/1277* (2013.01); *B67D 1/1279* (2013.01); *B67D 1/1281* (2013.01); *B67D 1/1466* (2013.01);
(Continued)

(58) Field of Classification Search
CPC .. B67D 1/0085; B67D 1/0021; B67D 1/0034; B67D 1/0075; B67D 1/0081; B67D 1/1252; B67D 1/1277; B67D 1/1279; B67D 1/1281; B67D 1/1466; B67D 2001/0093; B67D 2001/1483; F16K 1/14; F16K 31/0662; F16K 31/0665; F16K 31/084
USPC ................. 222/144.5; 137/112, 606, 596.17; 251/112

See application file for complete search history.

(56) References Cited

U.S. PATENT DOCUMENTS 3,948,419 A * 4/1976 Polster ................. B67D 1/1234
222/61
4,771,983 A * 9/1988 Sakaguchi .......... F16K 31/0651
251/129.08

(Continued)

*Primary Examiner* — Pual R Durand
*Assistant Examiner* — Andrew P Bainbridge
(74) *Attorney, Agent, or Firm* — CF3; Stephen Eisenmann

(57) ABSTRACT

Examples disclosed herein relate to conduits, devices, systems and methods, which may include a dispensing device including a valve configured to interact with an inlet stream, the inlet stream having a first pressure, the valve having an outlet area with an outlet stream, the outlet stream having a second pressure; and a solenoid configured to interact with the outlet stream.

11 Claims, 35 Drawing Sheets

Related U.S. Application Data

(60) Provisional application No. 62/399,977, filed on Sep. 26, 2016, provisional application No. 62/480,372, filed on Apr. 1, 2017, provisional application No. 62/506,083, filed on May 15, 2017, provisional application No. 62/432,294, filed on Dec. 9, 2016.

(51) Int. Cl.
    *B67D 1/14* (2006.01)
    *F16K 1/14* (2006.01)
    *F16K 31/06* (2006.01)
    *F16K 31/08* (2006.01)

(52) U.S. Cl.
    CPC ............ *F16K 1/14* (2013.01); *F16K 31/0662* (2013.01); *F16K 31/086* (2013.01); *B67D 2001/0093* (2013.01); *B67D 2001/1483* (2013.01)

(56) References Cited

U.S. PATENT DOCUMENTS

| | | | | |
|---|---|---|---|---|
| 4,960,228 | A * | 10/1990 | Takahashi | B01F 3/04808 222/129.1 |
| 6,810,909 | B2 * | 11/2004 | Herbert | F16K 31/0693 137/596.17 |
| 8,336,736 | B2 * | 12/2012 | Schroeder | F16L 39/00 222/144.5 |
| 2003/0136449 | A1 * | 7/2003 | Boddy | F16K 31/0665 137/596.17 |
| 2003/0234051 | A1 * | 12/2003 | Toivonen | F16K 31/084 137/554 |
| 2014/0263447 | A1 * | 9/2014 | Peters, Jr. | B67D 1/0041 222/129.1 |
| 2015/0160662 | A1 * | 6/2015 | Ohmi | G01F 1/363 137/625.4 |
| 2015/0191341 | A1 * | 7/2015 | Martindale | B67D 1/0888 222/1 |

* cited by examiner

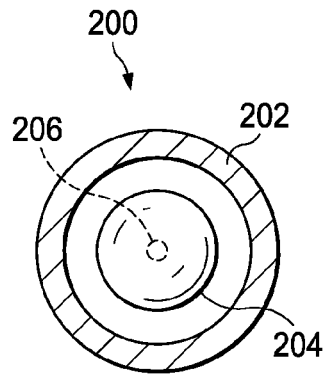
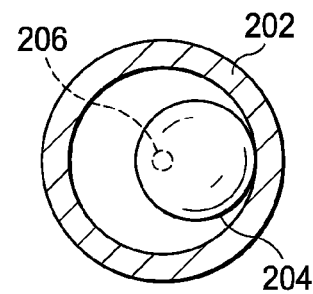
FIG. 1A      FIG. 2A
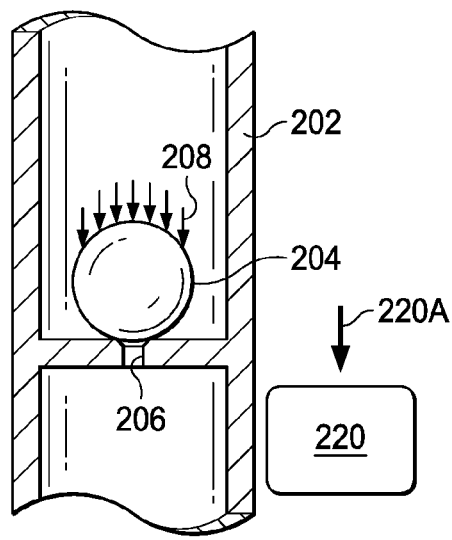
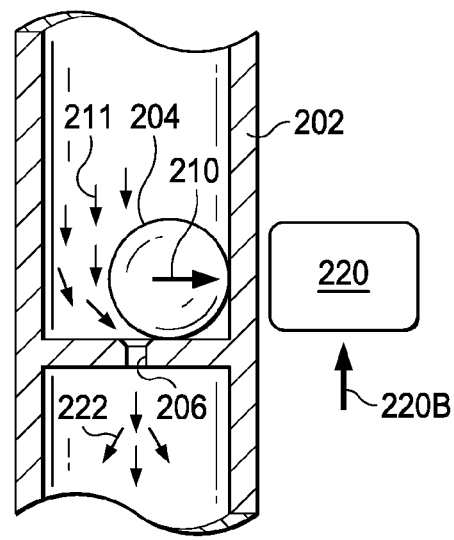
FIG. 1B      FIG. 2B

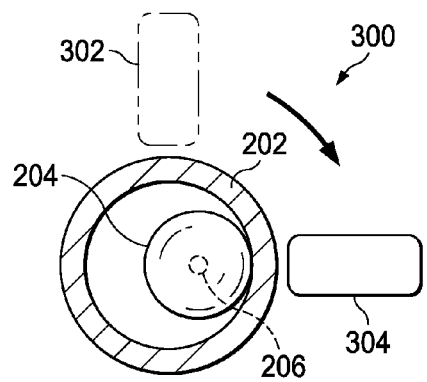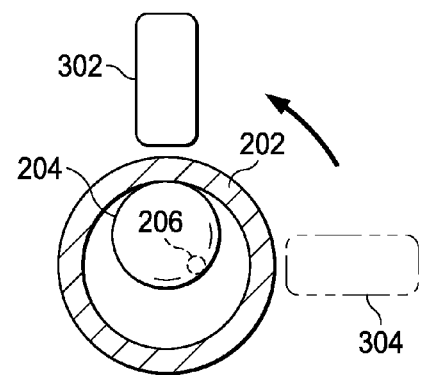
FIG. 3A  FIG. 4A
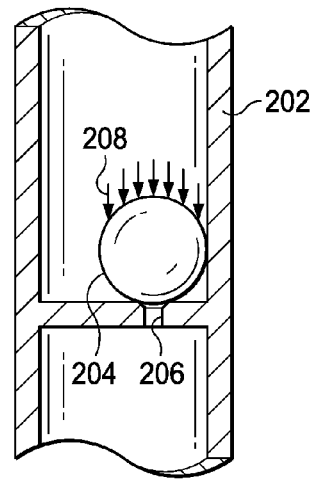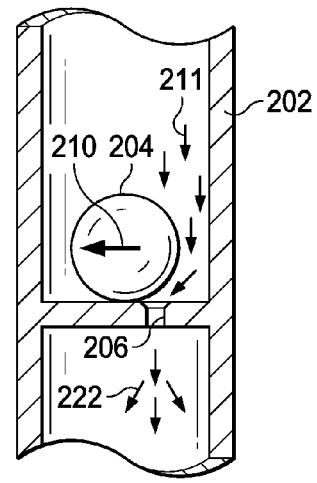
FIG. 3B  FIG. 4B

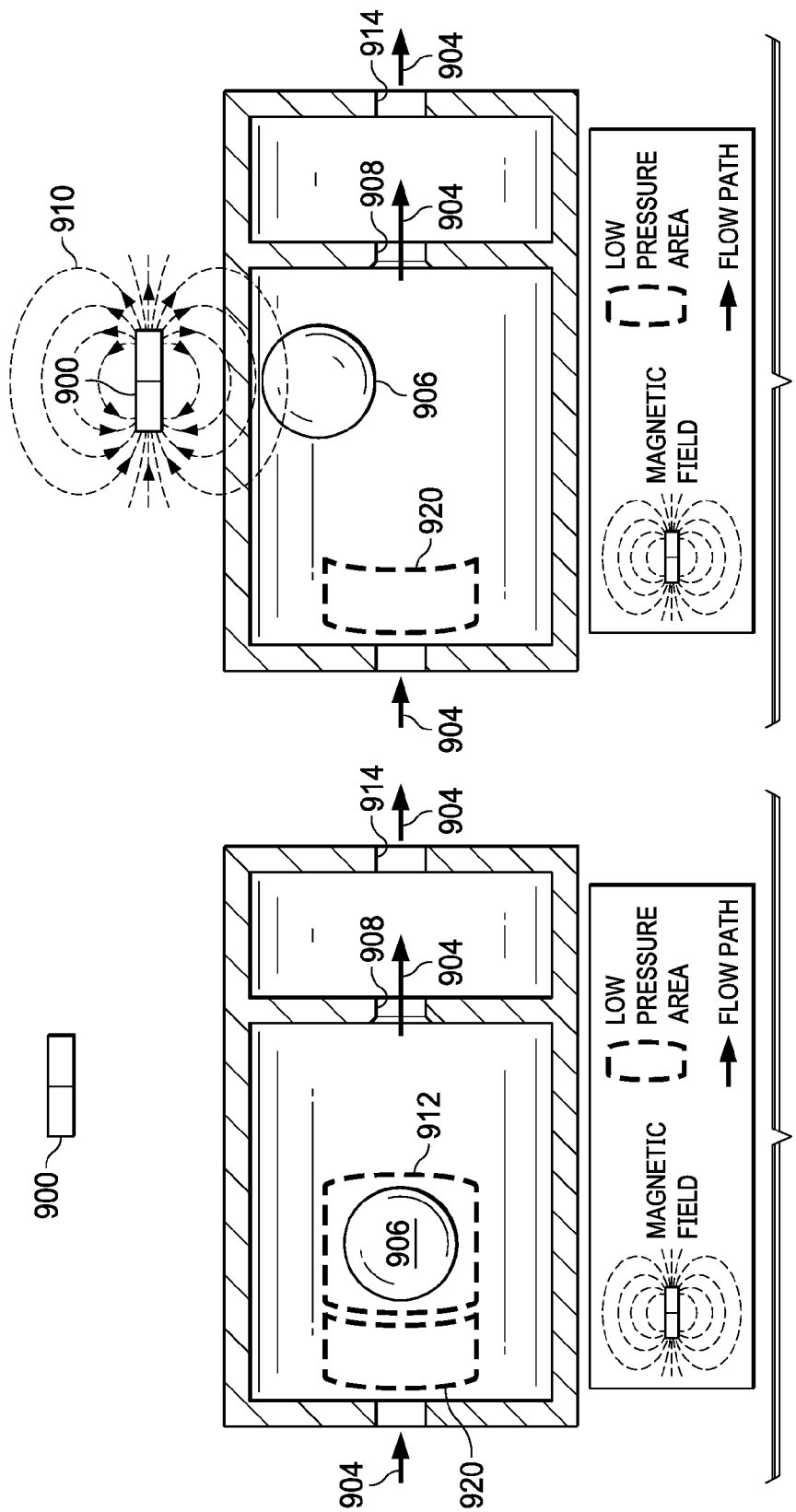

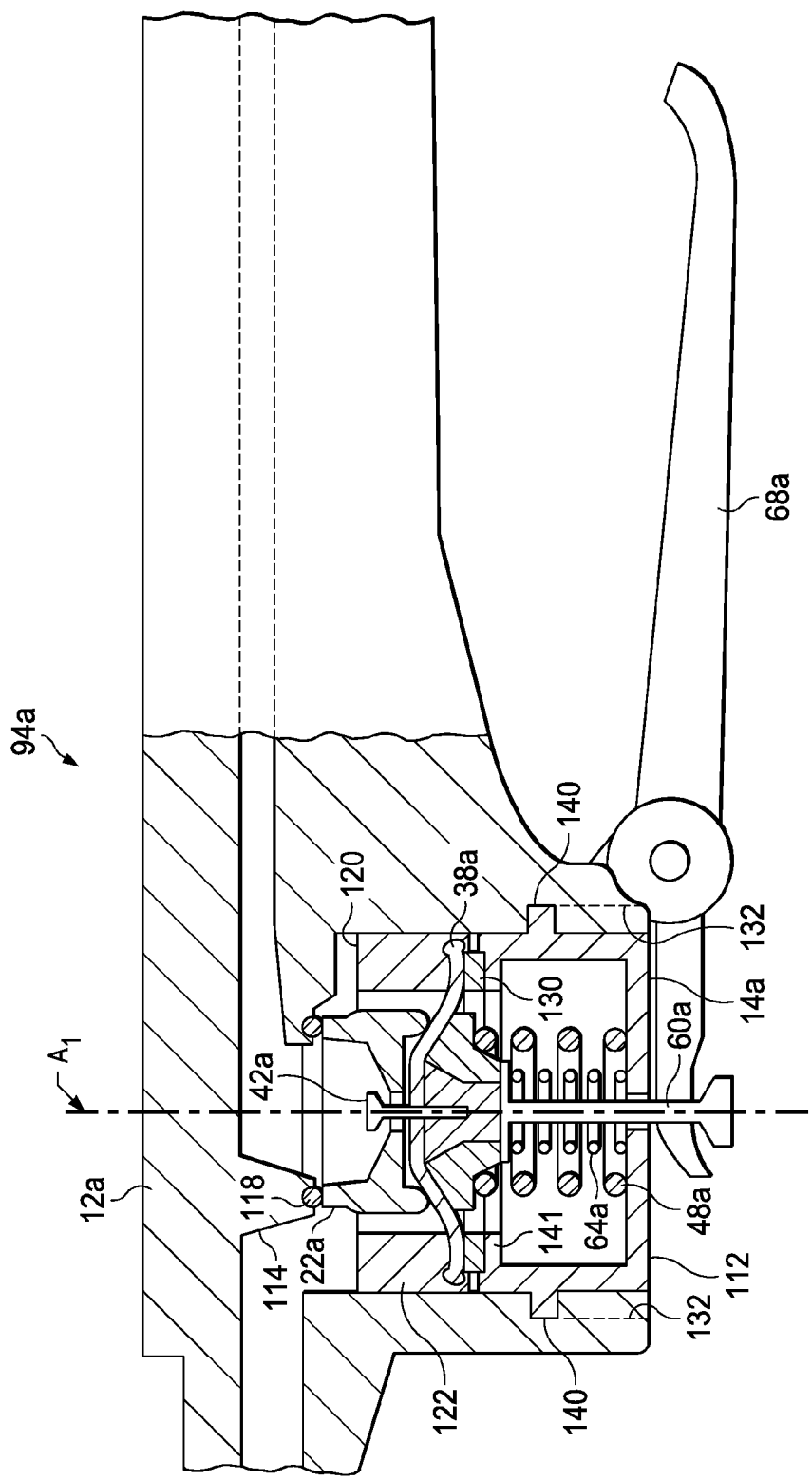

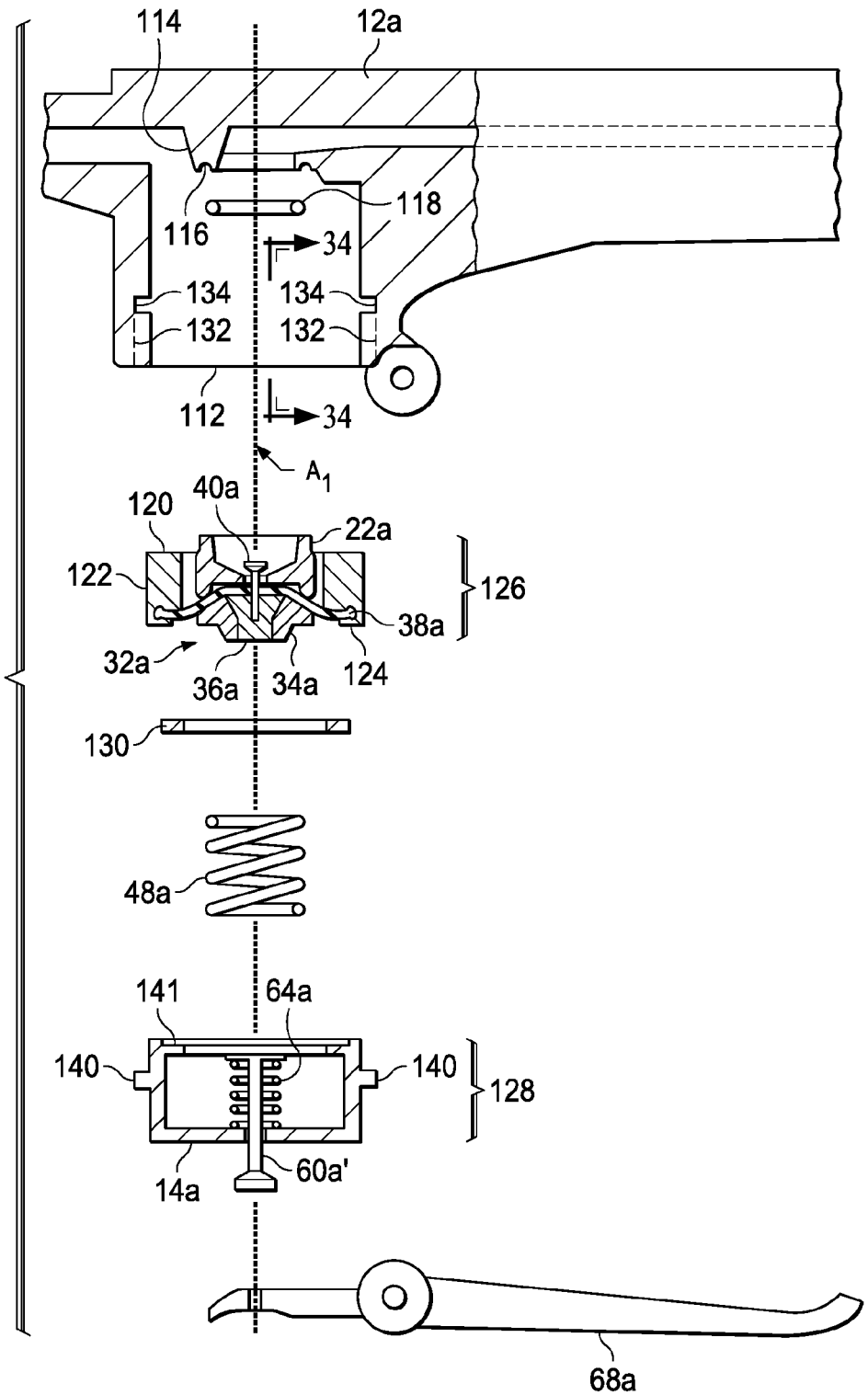

VALVE DEVICE

REFERENCE

The present application claims priority to and is a continuation-in-part of U.S. patent application Ser. No. 15/714,447, entitled "Magnetically Controlled Valve Using a Blocking Device and a Movement Device", filed on Sep. 25, 2017 where U.S. patent application Ser. No. 15/714,447 claims priority to U.S. provisional patent application Ser. No. 62/399,977, entitled "Magnetically Controlled Valve Using an Internally Disposed Ball and an External Magnetic Source", filed on Sep. 26, 2016, U.S. provisional patent application Ser. No. 62/480,372, entitled "Tower Apparatus and Methods", filed on Apr. 1, 2017, U.S. provisional patent application Ser. No. 62/506,083, entitled "High Ratio Fluid Control", filed on May 15, 2017, and U.S. provisional patent application Ser. No. 62/432,294, entitled "Valve Device", filed on Dec. 9, 2016, which are incorporated in their entireties herein by reference.

FIELD

The subject matter disclosed herein relates to a dispensing unit with ball functionality. More specifically, to a ball functionality that allows for enhance fluid discharge.

INFORMATION

The dispensing industry has numerous ways to dispense one or more fluids and/or gases. This disclosure highlights enhanced devices, methods, and systems for dispensing these one or more fluids and/or gases.

Carbonated dispensing head valves commonly incorporate a "paddle valve" having an arm that activates the "open and close" function of the valve. The arm is required to penetrate through the chamber wall into the liquid chambers. This penetration creates a major failure point (i.e. leakage, sealing issues, etc.) of the existing units on the market. Additionally, with "wet" pistons in the solenoid a disadvantage occurs with the requirement that is has to be closely machined parallel to the sliding surfaces, as accuracy of the sliding surfaces is critical to maintaining closing of the orifice. However, the lubricant for the sliding is typically the fluid that is being turned on and off. Thus, in many cases the character of the fluid can have problems serving as a lubricant. Lastly, as the piston is fixed, it is not self-cleaning. It is to overcoming these problems with current paddle valves that the below disclosed novel valve is directed to.

BRIEF DESCRIPTION OF THE FIGURES

Non-limiting and non-exhaustive examples will be described with reference to the following figures, wherein like reference numerals refer to like parts throughout the various figures.

FIG. 1A is an illustration of a ball functionality, according to one embodiment.

FIG. 1B is another illustration of a ball functionality, according to one embodiment.

FIG. 2A is another illustration of a ball functionality, according to one embodiment.

FIG. 2B is another illustration of a ball functionality, according to one embodiment.

FIG. 3A is another illustration of a ball functionality, according to one embodiment.

FIG. 3B is another illustration of a ball functionality, according to one embodiment.

FIG. 4A is another illustration of a ball functionality, according to one embodiment.

FIG. 4B is another illustration of a ball functionality, according to one embodiment.

FIG. 9C is another illustration of a ball functionality, according to one embodiment.

FIG. 9D is another illustration of a ball functionality, according to one embodiment.

FIG. 32 is an illustration of a dispensing unit, according to one embodiment.

FIG. 33 is an illustration of a dispensing unit, according to one embodiment.

DETAILED DESCRIPTION

Figure 5A:
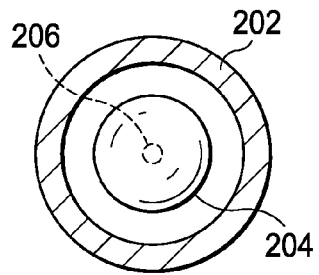
FIG. 5A is another illustration of a ball functionality, according to one embodiment.

Disclosed is a novel valve that does not require a shaft, piston, etc. or other component that is required to penetrated through the wall of the chamber where the liquid travels through (i.e. penetrates from outside the liquid to inside the chamber or wet side). With the below described valve, the necessity to penetrate into the wet side to actuate the "on/off" for the valve is eliminated.

A ball or other substantially round or spherical object (collectively "Ball") may be used and controlled by rolling the Ball off the opening to open the valve for fluid flow there through. This mechanism of rolling the Ball off the opening is a mechanically easier process than the conventional lifting or diaphragm of the Ball in order to open the passage/orifice.

With the disclosed rolling Ball valve, once the Ball is even partially off the orifice/opening then the pressure will equalize on both sides of the orifice and the effort to move the Ball further off, farther to fully open, may take almost no energy at all. Once the Ball is decoupled from the magnet or the electro magnet is off—the fluid flow itself will roll [suck] the Ball back into the orifice and close the valve. The higher the input pressure the tighter the valve closes. In practice the orifice, as depicted, would be the most accommodating design for a valve seat as well (i.e. a self-cleaning rubber design) as used in the CFValves.

FIG. 1A and FIG. 1B illustrate a first embodiment for the valve in a valve closed position. FIG. 1A illustrates a top sectional view, whereas FIG. 1B illustrates a side sectional view for the first embodiment in the closed position. As seen in these two Figures a Ball covers/closed an orifice opening, with a portion of the Ball extending into the orifice opening. With the Ball closing the orifice opening, fluid is prevented from flowing through the pipe, tube, chamber, hose or other type if fluid conduit (all collectively referred to as "Conduit"). As seen in FIG. 1B a magnetic coupling located on an external/outside of the Conduit is out of magnetic range of the metal Ball and thus is unable to control the movement or position of the Ball. The Ball is therefore forced in the shown sealing position with respect to the orifice opening by the pressure flow within the Conduit. Preferably, the Ball is constructed from a magnetic, metallic and/or rigid material and all are considered within the scope of the disclosure.

FIG. 2A and FIG. 2B illustrate a first embodiment for the valve in a valve open position. FIG. 2A illustrates a top sectional view, whereas FIG. 2B illustrates a side sectional view for the first embodiment in the open position. As seen in these two Figures, the magnetic coupling is moved within magnetic range of the Ball, which causes the Ball to pulled towards the externally located magnetic coupling and no longer sealing the orifice opening, thus, allowing fluid flow through the orifice opening.

FIG. 3A and FIG. 3B illustrate a second embodiment for the valve in a valve closed position. FIG. 3A illustrates a top sectional view, whereas FIG. 3B illustrates a side sectional view for the second embodiment in a closed position. In this embodiment, the orifice opening is preferably not centered. With the magnetic coupling out of magnetic range with the Ball, the Ball is forced to seal the orifice opening by flow pressure. As seen in FIG. 4A and FIG. 4B when the magnetic coupling is rotated (e.g. 90 degrees, etc.), the magnetic coupling is now within magnetic range of the Ball, and thus pulls the Ball causing the orifice opening to be open and allow fluid flow there through.

Figure 6A:
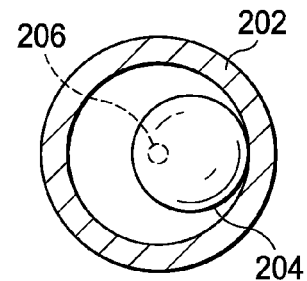
FIG. 6A is another illustration of a ball functionality, according to one embodiment.
Figure 5B:
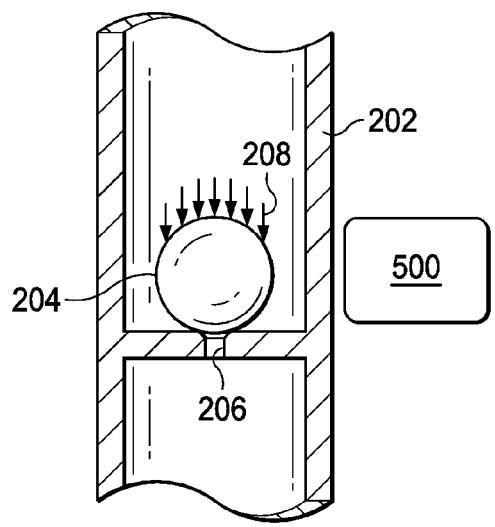
FIG. 5B is another illustration of a ball functionality, according to one embodiment.
Figure 6B:
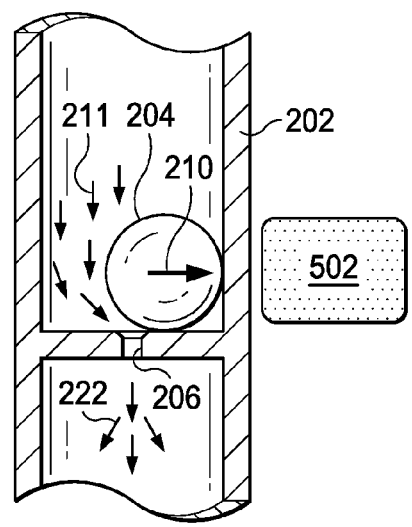
FIG. 6B is another illustration of a ball functionality, according to one embodiment.

FIG. 5A and FIG. 5B illustrate a third embodiment for the valve in a valve closed position. FIG. 5A illustrates a top sectional view, whereas FIG. 5B illustrates a side sectional view for the third embodiment in a closed position. In this embodiment, the orifice opening can be preferably centered and an electro magnet provided which preferably remains in a fixed position with respect to the Conduit. When the electro magnet "off" (i.e. not energized), the Ball is forced to seal the orifice opening by flow pressure. As seen in FIG. 6A and FIG. 6B when the electro magnet is "on" (i.e. energized), the electro magnet pulls the Ball towards the electro magnet which causes the orifice opening to be open and allow fluid flow there through.

Figure 7A:
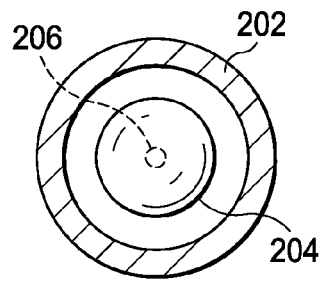
FIG. 7A is another illustration of a ball functionality, according to one embodiment.
Figure 8A:
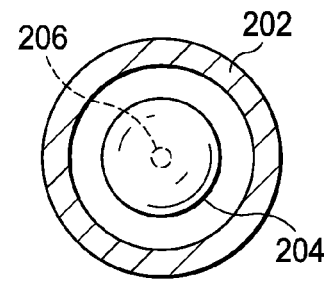
FIG. 8A is another illustration of a ball functionality, according to one embodiment.
Figure 7B:
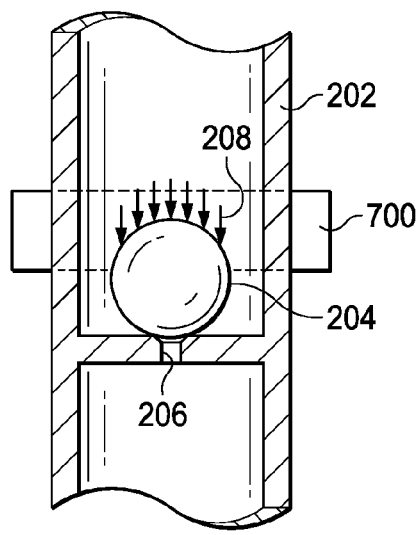
FIG. 7B is another illustration of a ball functionality, according to one embodiment.
Figure 8B:
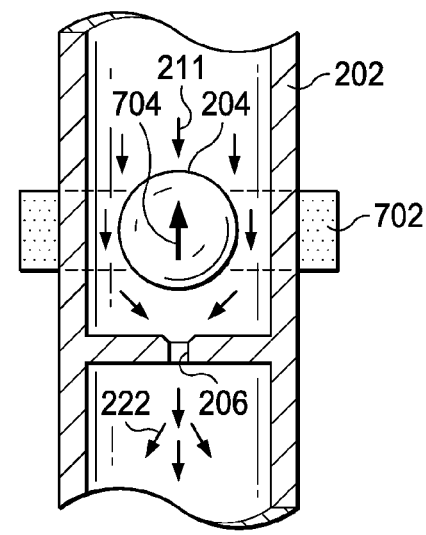
FIG. 8B is another illustration of a ball functionality, according to one embodiment.

FIG. 7A and FIG. 7B illustrate a fourth embodiment for the valve in a valve closed position. FIG. 7A illustrates a top sectional view, whereas FIG. 7B illustrates a side sectional view for the third embodiment in a closed position. In this embodiment, the orifice opening can be preferably centered (however any spot can be utilized (e.g., right, center, left, slightly off center, 1 inch off center, etc.)) and a magnetic coil provided which preferably remains in a fixed position with respect to the Conduit. When the electro magnet "off" (i.e. not energized), the Ball is forced to seal the orifice opening by flow pressure. As seen in FIG. 8A and FIG. 8B when the magnetic coil is "on" (i.e. energized and creates a magnetic field), the Ball is pulled towards the magnetic field which causes the orifice opening to be open and allow fluid flow there through.

Thus, in all embodiments, the movement of the Ball over the orifice opening and out of the orifice opening is achieved without having to penetrate the wall of the Conduit which eliminates or greatly reduces previous leakage and other sealing problems, experienced at the penetrate point and the other above-identified problems with prior valves, such as, but not limited to "paddle valves".

One non-limiting application for the above-described and shown novel valve is in use with a beverage machine, such as, but not limited to, the multiple beverage dispensing machines found at restaurants where a customer takes their cup and positions the cup under one of the plurality of beverage dispensing heads and presses the cup against a lever to initiate dispensing. For this application, the magnet is moved or rotated by the a mechanical lever that is secured to, part of or otherwise in mechanical communication with the lever that the customer presses their cup against to initiate dispensing. Here, when the level is pressed by the customer, the magnet is moved or rotated such that it is in range with the Ball, thus, causing the Ball to be pulled out of and/or away from the orifice, thus allowing the desired beverage to be dispensed out of the dispensing head above the customer's cup.

For the embodiments where the magnet is energized (as opposed to being moved or rotated) to pull the Ball away or out of the orifice, the electrical source can be a 24 V AC, though such is not considered limiting. Here, when the customer presses their cup against the level, an electrical switch is turned "closed-on" (or "opened-off depending on how the circuit is wired), causing the energy from the electrical source to flow to the electro magnet or magnetic coil, thus, causing the electro magnet or magnetic coil to pull and/or push the Ball out of or away from the orifice.

As an alternative to the customer pushing their cup against a lever, certain beverage machines operate with the customer pushing a button to activate an electrical circuit. Thus, this pressing of the button can be substituted for pushing the cup against the lever in the above non-limiting examples. In either method (pushing cup against lever or pressing button), the objective is to stop or start a flow of fluid through the tube, pipe, etc. through the use of one of the above described Ball/orifice magnet embodiments.

Though not considered limiting, the magnet, electro magnet or magnetic coil can be attached or positioned adjacent to the Conduit by a conventional mechanical fastener, screws, bolts, etc., as well as glued, tape or other adhesive, incased in a plastic cover. Additionally, where the Conduit is plastic, a receptacle for the attachment—magnet, electro magnet or magnetic coil can be molded.

The disclosed embodiments are not considered limited to any particular magnetic materials, orifice opening dimensions, orifice location, Ball dimensions, Ball shape (e.g., circle, ball, square, triangle, etc.) Ball to orifice opening ratio, magnet location, electro magnet location or magnetic coil location All locations, sizes, shapes, measurements, ratios, amounts, angles, component or part locations, configurations, dimensions, values, materials, orientations, etc. discussed above or shown in the drawings are merely by way of example and are not considered limiting and other locations, sizes, shapes, measurements, ratios, amounts, angles, component or part locations, configurations, dimensions, values, materials, orientations, etc. can be chosen and used and all are considered within the scope of the disclosure.

Dimensions of certain parts as shown in the drawings may have been modified and/or exaggerated for the purpose of clarity of illustration and are not considered limiting.

While the valve has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

In FIG. 1A, an illustration of a ball functionality is shown, according to one embodiment. In one example, a dispensing element 200 may include a conduit 202, a blocking element 204, and a dispensing element 206 (e.g., orifice). In various examples, the conduit 202 may be a hose, a pipe, and/or any other element with an external surface and an internal surface which allows for the passage of one or more fluids and/or one or more gases. In various examples, the blocking element 204 may be a ball, a block, and/or any other element that stops the passage of one or more fluids and/or one or more gases when the blocking element is in one or more positions relative to the dispensing element. In this example shown in FIG. 1A, the blocking element 204 is positioned over the dispensing element 206 which stops the passage of one or more fluids and/or one or more gases which can be seen in FIG. 1B. In the example shown in FIG. 1B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole and/or the orifice opening(s)). In this example, the pressure 208 is all around the blocking element but is strongest when it is parallel with the dispensing element. A movement device 220 (e.g., a magnet) is in a first position 220A which does not allow the movement device 220 to interact with the blocking element 204.

In FIG. 2A, another illustration of a ball functionality is shown, according to one embodiment. In this example, the blocking element 204 has moved to a second position relative to the dispensing element 206. In this example, the movement device 220 has moved to a second position 220B which allows the movement device 220 to interact with the blocking element as shown in FIG. 2B. The movement device 220 (e.g., a magnet) has caused the blocking element 204 (e.g., a Ferro-magnetic material and/or a metal ball) to move in a first direction 210 towards the movement device 220 which allows for a first fluid flow 211 to move towards the dispensing element 206 and a second fluid flow 222 through the dispensing element 206 until the movement device is moved back to the first position 220A which causes the blocking element to move back to a position to block the flow of fluids through the dispensing element 206 as shown in FIG. 1B. The movement device 220 in this example is magnetically tied to the blocking element 204. Therefore, when the movement device 220 moves the blocking element 204 moves. It should be noted that there is a pressure difference (e.g., pressure differential) between the second area with the second fluid flow 222 and the first area with the first fluid flow 211.

In FIG. 3A, an illustration of a ball functionality is shown, according to one embodiment. In one example, a dispensing device 300 may include a conduit 202, a blocking element 204, and a dispensing element 206. In various examples, the conduit 202 may be a hose, a pipe, and/or any other element with an external surface and an internal surface which allows for the passage of one or more fluids and/or one or more gases. In various examples, the blocking element 204 may be a ball, a block, an egg shaped item, a tear drop shaped item, a golf tee shaped item, and/or any other shape. Further the blocking element 204 may be any other element that stops the passage of one or more fluids and/or one or more gases when the blocking element is in one or more positions relative to the dispensing element. In this example shown in FIG. 3A, the blocking element 204 is positioned over the dispensing element 206 which stops the passage of one or more fluids and/or one or more gases which can be seen in FIG. 3B. In the example shown in FIG. 3B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole). A movement device (e.g., a magnet) is in a first position 304 which does not allow the movement device to interact with the blocking element 204.

In FIG. 4A, another illustration of a ball functionality is shown, according to one embodiment. In this example, the blocking element 204 has moved to a second position relative to the dispensing element 206. In this example, the movement device has moved to a second position 302 which allows the movement device to interact with the blocking element as shown in FIG. 4B. The movement device (e.g., a magnet) has caused the blocking element 204 (e.g., a Ferro-magnetic material and/or a metal ball) to move in a first direction 210 which allows for a first fluid flow 211 to move towards the dispensing element 206 and a second fluid flow 222 through the dispensing element 206 until the movement device is moved back to the first position 304 which causes the blocking element to move back to a position to block the flow of fluids through the dispensing element 206 as shown in FIG. 4B. In this example, the movement device is magnetically locked onto the blocking element 204. Therefore, when the movement device moves the blocking element 204 moves.

In FIG. 5A, an illustration of a ball functionality is shown, according to one embodiment. In one example, a dispensing system may include the conduit 202, the blocking element 204, and the dispensing element 206. In various examples, the conduit 202 may be a hose, a pipe, and/or any other element with an external surface and an internal surface which allows for the passage of one or more fluids and/or one or more gases. In various examples, the blocking element 204 may be a ball, a block, and/or any other element that stops the passage of one or more fluids and/or one or more gases when the blocking element is in one or more positions relative to the dispensing element. In this example shown in FIG. 5A, the blocking element 204 is positioned over the dispensing element 206 which stops the passage of one or more fluids and/or one or more gases which can be seen in FIG. 5B. In the example shown in FIG. 5B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole or sealing ring). A movement device 500 (e.g., a magnet) is in a first state (e.g., de-energized) which does not allow the movement device 500 to interact with the blocking element 204.

In FIG. 6A, another illustration of a ball functionality is shown, according to one embodiment. In this example, the blocking element 204 has moved to a second position relative to the dispensing element 206. In this example, the movement device 500 has been energized and is in a second state 502 which allows the energized movement device 502 to interact with the blocking element as shown in FIG. 6B. The energized movement device 502 (e.g., a magnet) has caused the blocking element 204 (e.g., a Ferro-magnetic material and/or a metal ball) to move in a first direction 210 towards the energized movement device 502 which allows for a first fluid flow 211 to move towards the dispensing element 206 and a second fluid flow 222 through the dispensing element 206 until the energized movement device 502 returns in an de-energized movement device 500 which causes the blocking element to move back to a position to block the flow of fluids through the dispensing element 206 as shown in FIG. 6B.

In FIG. 7A, an illustration of a ball functionality is shown, according to one embodiment. In one example, a dispensing apparatus may include the conduit 202, the blocking element 204, and the dispensing element 206. In various examples, the conduit 202 may be a hose, a pipe, and/or any other element with an external surface and an internal surface which allows for the passage of one or more fluids and/or one or more gases. In various examples, the blocking element 204 may be a ball, a block, and/or any other element that stops the passage of one or more fluids and/or one or more gases when the blocking element is in one or more positions relative to the dispensing element. In this example shown in FIG. 7A, the blocking element 204 is positioned over the dispensing element 206 which stops the passage of one or more fluids and/or one or more gases which can be seen in FIG. 7B. In the example shown in FIG. 7B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole). A movement device 700 (e.g., a magnet) is in a first state (e.g., de-energized) which does not allow the movement device 700 to interact with the blocking element 204.

In FIG. 8A, another illustration of a ball functionality is shown, according to one embodiment. In this example, the blocking element 204 has moved to a second position relative to the dispensing element 206. In this example, the movement device 700 has been energized and is in a second state 702 which allows the energized movement device 702 to interact with the blocking element as shown in FIG. 8B. The energized movement device 702 (e.g., a magnet) has caused the blocking element 204 (e.g., a Ferro-magnetic material and/or a metal ball) to move in a first direction 704 towards the energized movement device 702 which allows for a first fluid flow 211 to move towards the dispensing element 206 and a second fluid flow 222 through the dispensing element 206 until the energized movement device 702 returns in an de-energized movement device 700 which causes the blocking element to move back to a position to block the flow of fluids through the dispensing element 206 as shown in FIG. 8B.

Figure 9B:
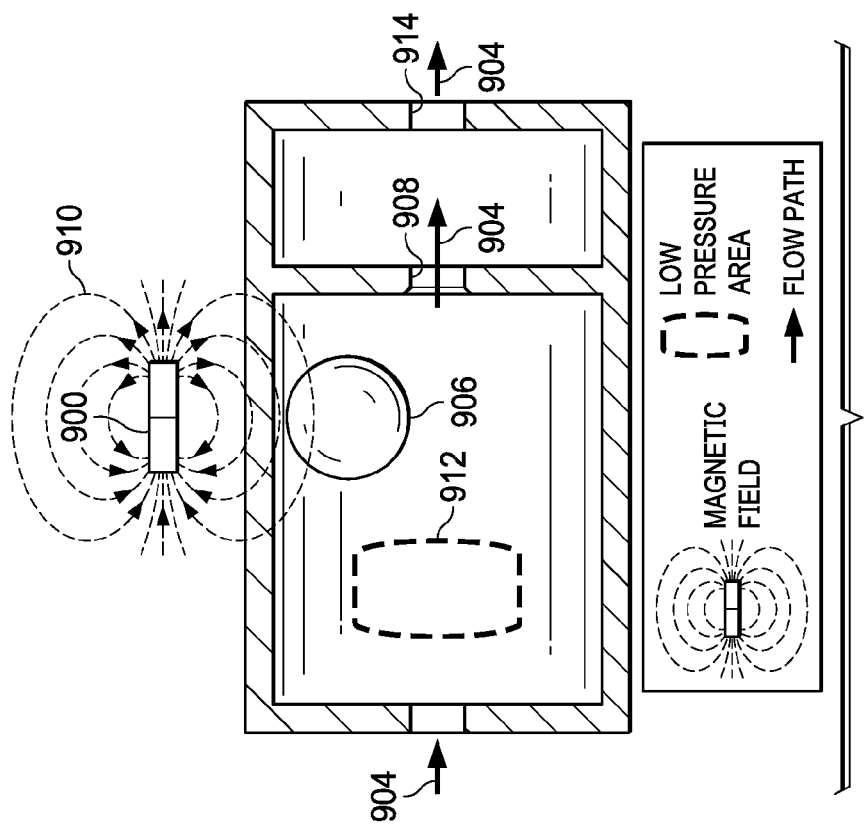
FIG. 9B is another illustration of a ball functionality, according to one embodiment.
Figure 9A:
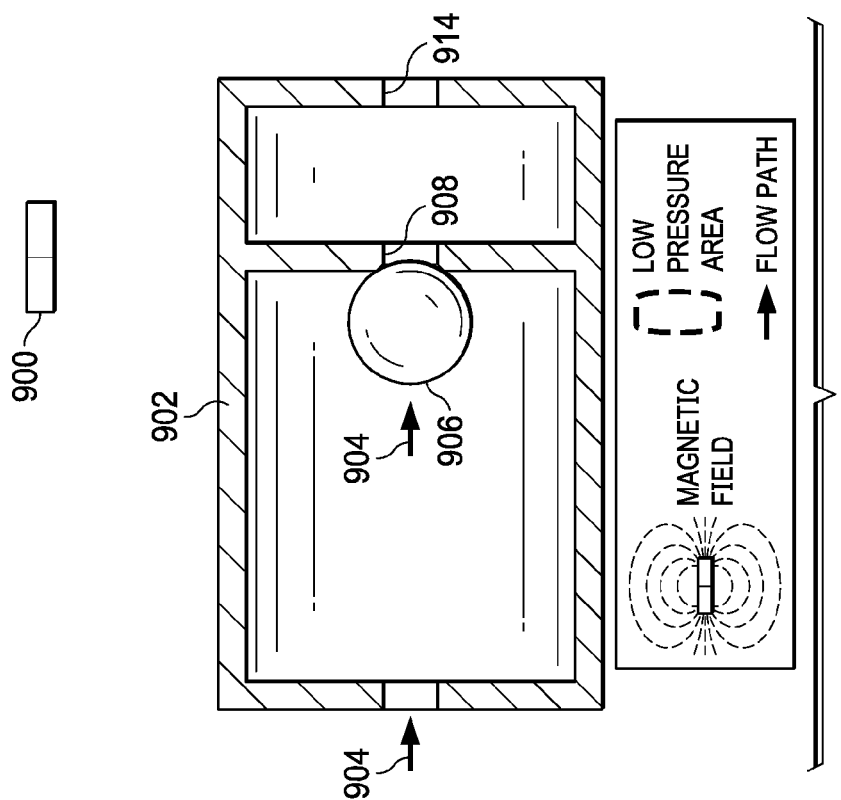
FIG. 9A is another illustration of a ball functionality, according to one embodiment.

In FIG. 9A, another illustration of a ball functionality is shown, according to one embodiment. A dispensing device 902 may include an inlet area with a fluid flow 904 that comes into a first chamber. The first chamber includes a blocking device 906 and a first chamber outlet area 908. Further, dispensing device 902 includes a dispensing device outlet area 914. In this example, a magnet 900 is not energized which allows the blocking device 906 to be in a first position relative to the first chamber outlet area 908 which prevents the fluid flow 904 from exiting the first chamber outlet area 908. In FIG. 9B, the magnet 900 is energized 910 which moves the blocking device 906 to a second position relative to the first chamber outlet area 908 and/or dispensing device outlet area 914 which allows the fluid flow 904 to exit from the first chamber outlet area 908 and creates a low pressure area 912.

In one example, the blocking device 906 becomes trapped in the low pressure area 912 and/or a second low pressure area 920 as shown in FIG. 9C. The magnet 900 may be energized 910 to remove the blocking device from the low pressure area 912 and/or a second low pressure area 920 as shown in FIG. 9D.

Figure 10A:
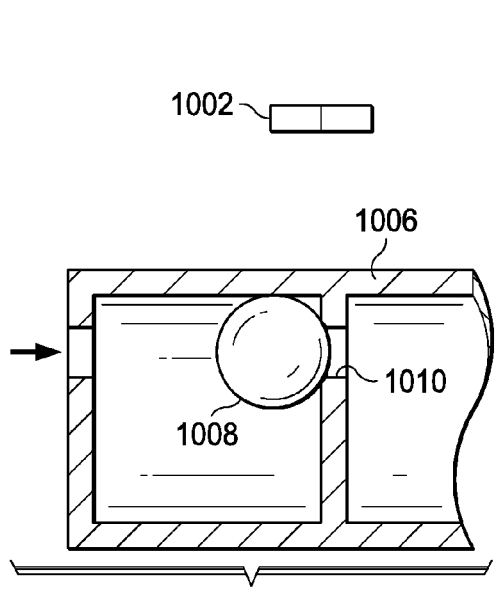
FIG. 10A is another illustration of a ball functionality, according to one embodiment.
Figure 10B:
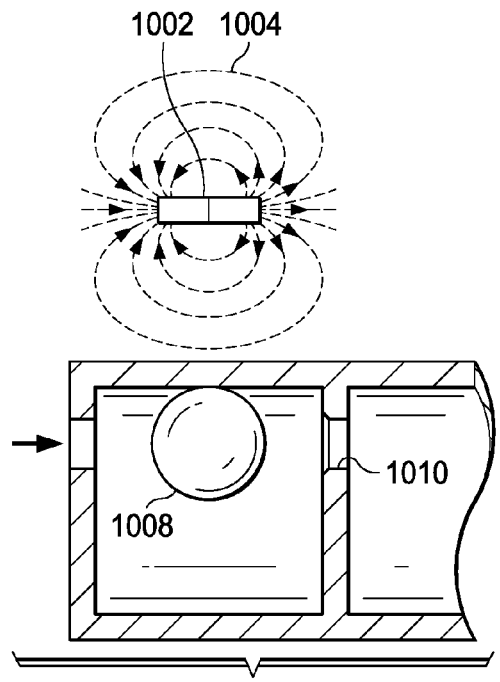
FIG. 10B is another illustration of a ball functionality, according to one embodiment.

FIG. 10A shows a dispensing apparatus 1006 with a metal ball 1008 (and/or a Ferro-magnetic material—e.g., brass), a dispensing area 1010, and a magnetic coil 1002. In this example, the magnetic coil 1002 is not energized which allows the metal ball 1008 to block the flow of liquids and/or gases from escaping through the dispensing area 1010. However, once the magnetic coil 1002 is energized 1004, the metal ball 1008 move to a second position which allows for the flow of liquids and/or gases via the dispensing area 1010.

Figure 11A:
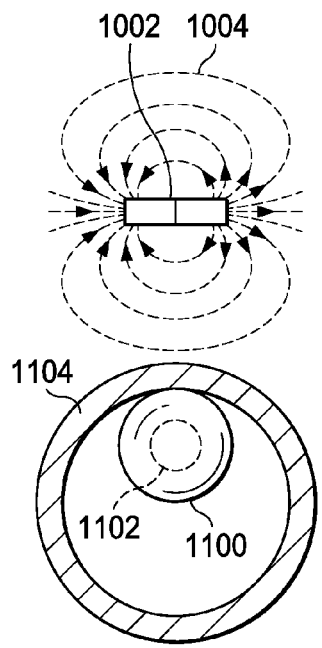
FIG. 11A is another illustration of a ball functionality, according to one embodiment.
Figure 11B:
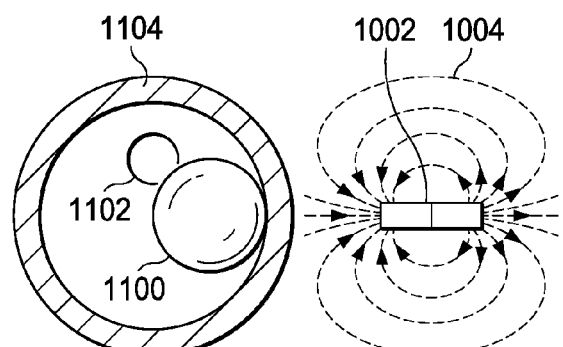
FIG. 11B is another illustration of a ball functionality, according to one embodiment.

FIG. 11A shows a dispensing system 1104 where a plastic covered metal ball 1100 is utilized to block the flow of fluids and/or gases from a dispensing unit 1102. In this example, once a magnet 1002 is energized, the plastic covered metal ball 1100 moves to a position that allows for the flow of fluids and/or gases from a dispensing unit 1102 as shown in FIG. 11B.

Figure 12:
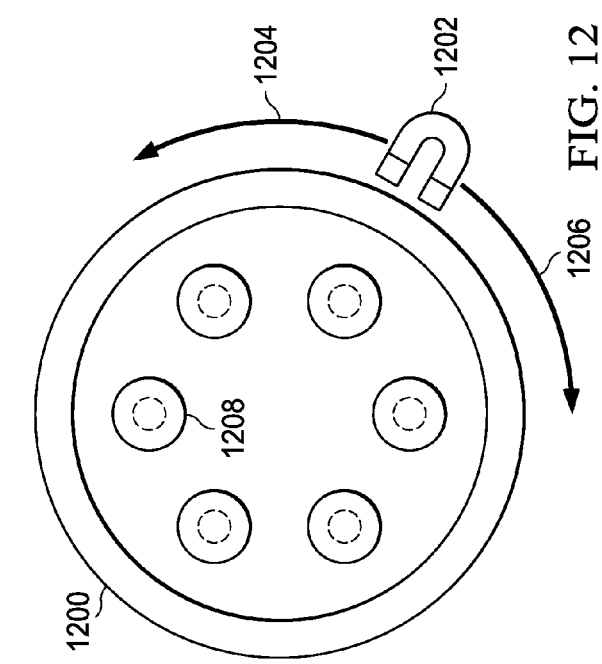
FIG. 12 is an illustration of a dispensing unit with one or more ball functionalities, according to one embodiment.

In FIG. 12, an illustration of a dispensing unit with one or more ball functionalities is shown, according to one embodiment. A dispensing system 1200 may include a magnet 1202 (and/or any other movement device and/or initiating device) and one or more dispensing units 1208. In one example, when the magnet 1202 moves in a first direction 1204 one or more of the one or more dispensing units 1208 may discharge one or more fluids and/or gases. In one example, when the magnet 1202 moves in a second direction 1206 one or more of the one or more dispensing units 1208 may discharge one or more fluids and/or gases. In a first example, an orange flavored drink may be dispensed when the magnet 1202 comes into a first relative position to a first dispensing unit. In a second example, a cherry flavored drink may be dispensed when the magnet 1202 comes into a second relative position to a second dispensing unit. In a third example, a cola flavored drink may be dispensed when the magnet 1202 comes into a third relative position to a third dispensing unit. In a fourth example, a lemon flavored drink may be dispensed when the magnet 1202 comes into a fourth relative position to a fourth dispensing unit. In an Nth example, a peach flavored drink may be dispensed when the magnet 1202 comes into an Nth relative position to an Nth dispensing unit.

Figure 13B:
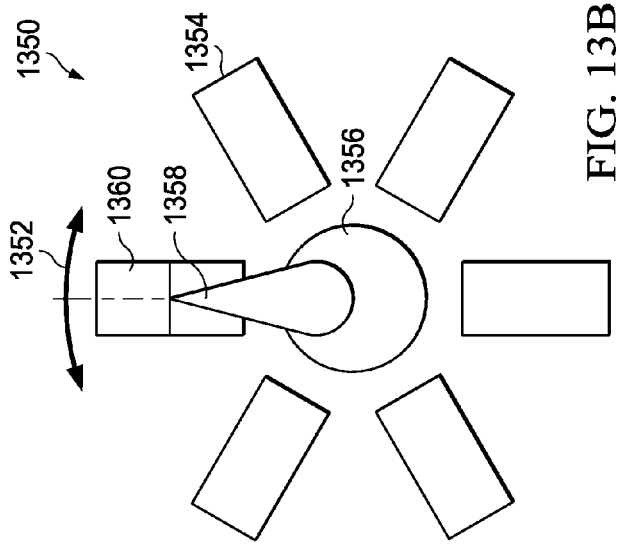
FIG. 13B is another illustration of a dispensing unit with one or more ball functionalities, according to one embodiment.
Figure 13A:
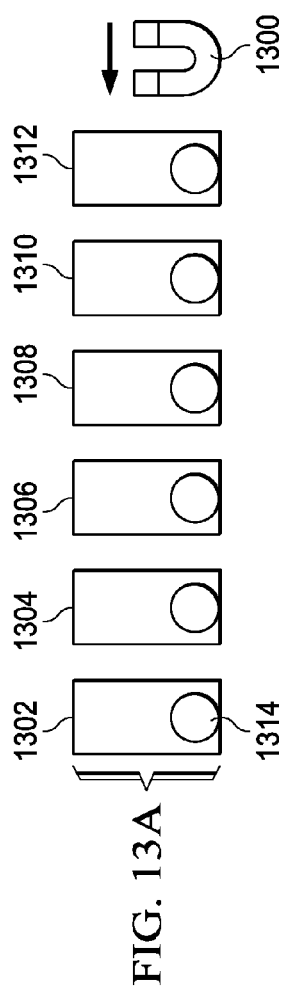
FIG. 13A is another illustration of a dispensing unit with one or more ball functionalities, according to one embodiment.

In FIG. 13A, another illustration of a dispensing unit with one or more ball functionalities is shown, according to one embodiment. A dispensing system may include a magnet 1300 (and/or any other movement device and/or initiating device) and one or more dispensing units (a first dispensing unit 1302, a second dispensing unit 1304, a third dispensing unit 1306, a fourth dispensing unit 1308, an Nth−1 dispensing unit 1310, and an Nth dispensing unit 1312. In a first example, an orange flavored drink may be dispensed when the magnet 1300 comes into a first relative position to a first dispensing unit 1302 by moving a blocking element 1314. In a second example, a cherry flavored drink may be dispensed when the magnet 1300 comes into a second relative position to a second dispensing unit 1304 by moving a blocking element 1314. In a third example, a cola flavored drink may be dispensed when the magnet 1300 comes into a third relative position to a third dispensing unit 1306 by moving a blocking element 1314. In a fourth example, a lemon flavored drink may be dispensed when the magnet 1300 comes into a fourth relative position to a fourth dispensing unit 1308 by moving a blocking element 1314. In an Nth−1 example, a black cherry flavored drink may be dispensed when the magnet 1300 comes into an Nth−1 relative position to an Nth−1 dispensing unit 1310 by moving a blocking element 1314. In an Nth example, a peach flavored drink may be dispensed when the magnet 1300 comes into an Nth relative position to an Nth dispensing unit 1312 by moving a blocking element 1314.

In FIG. 13B, another illustration of a dispensing unit with one or more ball functionalities is shown, according to one embodiment. In this example, a dispensing apparatus 1350 includes one or more dispensing units 1354 and a currently selected dispensing unit 1360. The currently selected dispensing unit 1360 dispenses one or more drinks via a triggering unit 1356 with a triggering mechanism 1358. In this example, the one or more dispensing units 1354 and/or the triggering unit 1356 and/or the triggering mechanism 1358 may move in any direction 1352.

Figure 14:
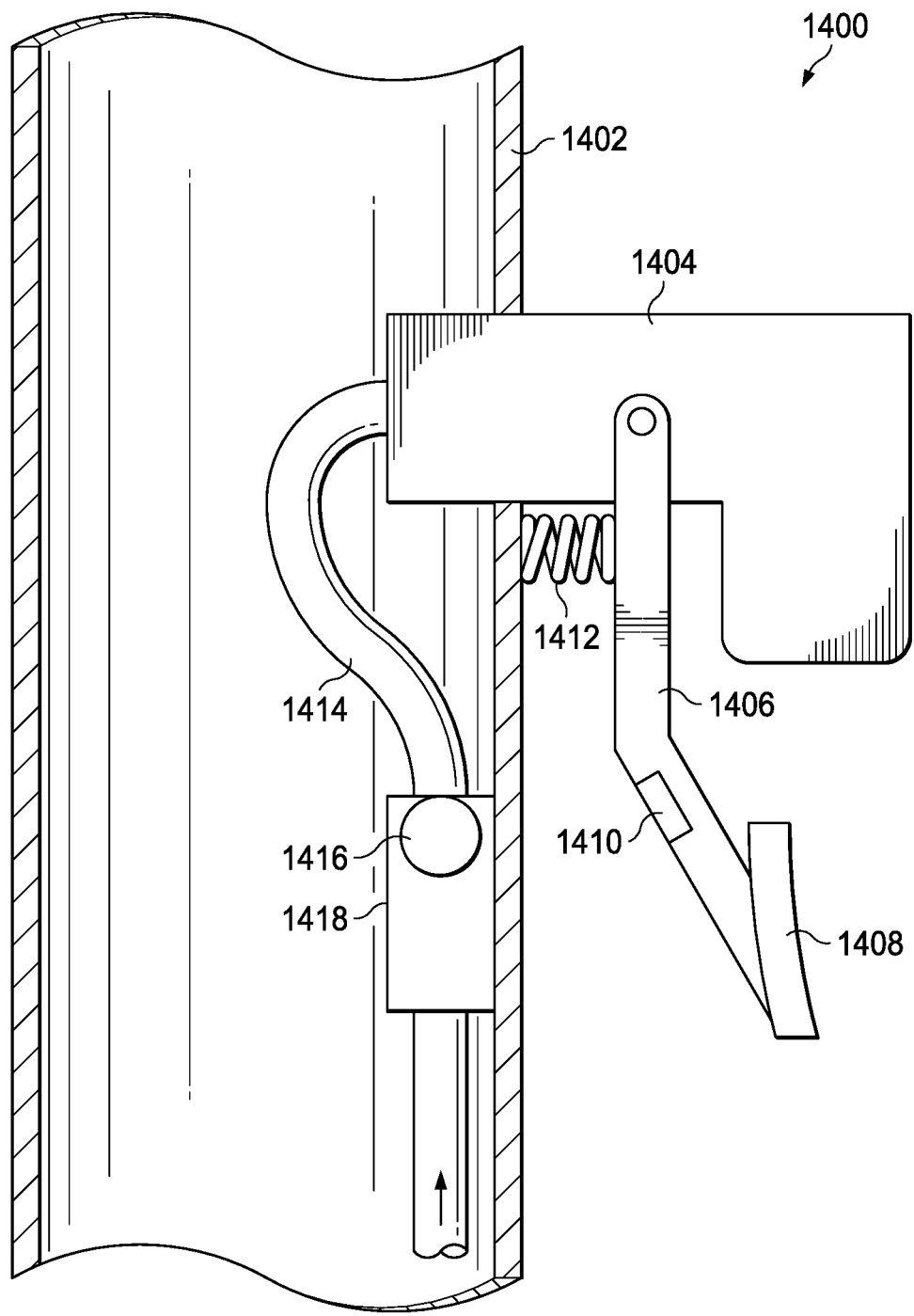
FIG. 14 is an illustration of a dispensing unit with one or more ball functionalities, according to one embodiment.

In FIG. 14, an illustration of a dispensing unit with one or more ball functionalities is shown, according to one embodiment. A dispensing system 1400 may include a dispensing unit 1402. The dispensing unit 1402 may include a dispensing head 1404, an input device 1406 with an input receiving area 1408 and magnetic area 1410, a drink unit 1418 with a blocking element 1416, and a feed line 1414. Further, the input device 1406 may have a spring support 1412. In one example, when a person wants a drink that person pushes their cup on the input receiving area 1408 which moves the input device 1406 towards the drink unit 1418. After the input device 1406 (and the magnetic area 1410) come in proximate to the drink unit 1418 (and the blocking element 1416) flow of the fluid is initiated based on the magnetic area 1410 moving the blocking element 1416. Once the person stops pushing the input device 1406, the magnetic area 1410 moves away from the blocking element 1416 and the flow of fluids is stopped by the blocking element 1416.

Figure 15A:
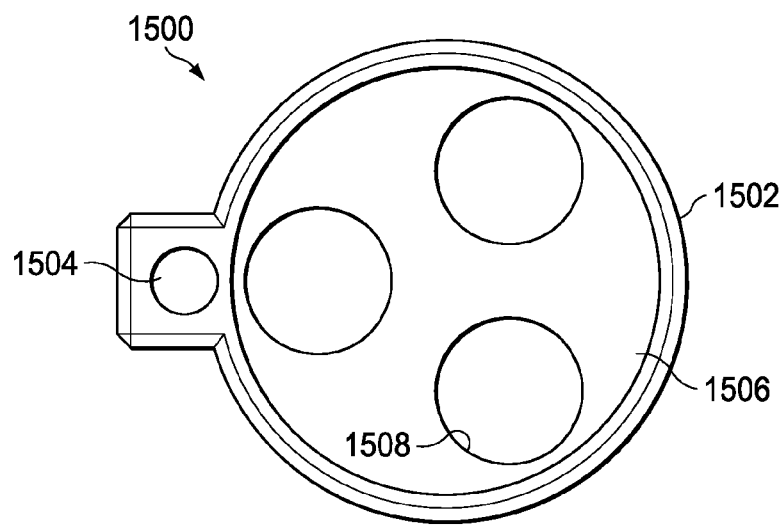
FIG. 15A is an illustration of dispensing unit, according to one embodiment.
Figure 15B:
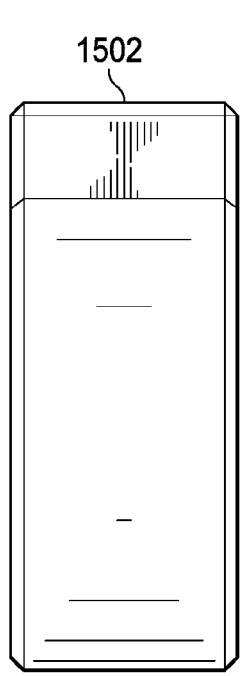
FIG. 15B is an illustration of dispensing unit, according to one embodiment.
Figure 15C:
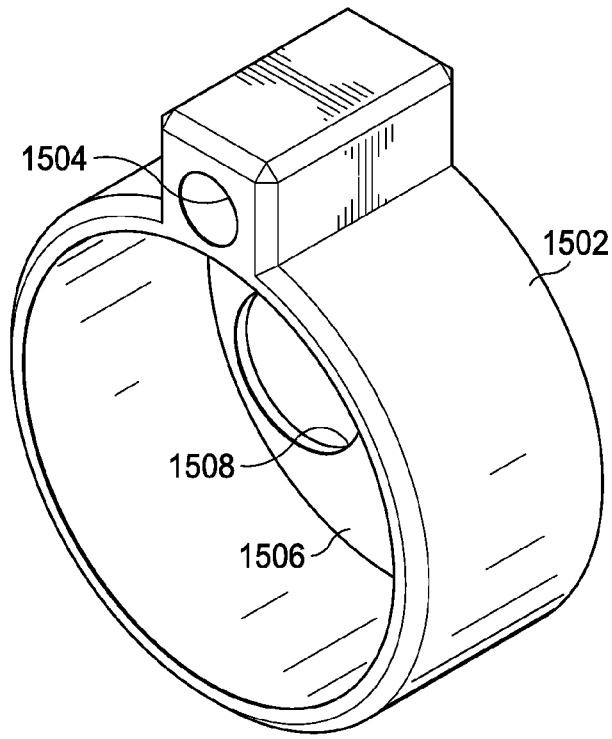
FIG. 15C is an illustration of dispensing unit, according to one embodiment.

FIG. 15A shows a top view of a dispensing unit 1500 including an outer surface 1502, an inner surface 1506, one or more locations for a drink unit 1508, and a magnetic area 1504. FIG. 15B shows a side view of the dispensing unit 1500. FIG. 15C shows another view of the dispensing unit 1500.

Figure 16A:
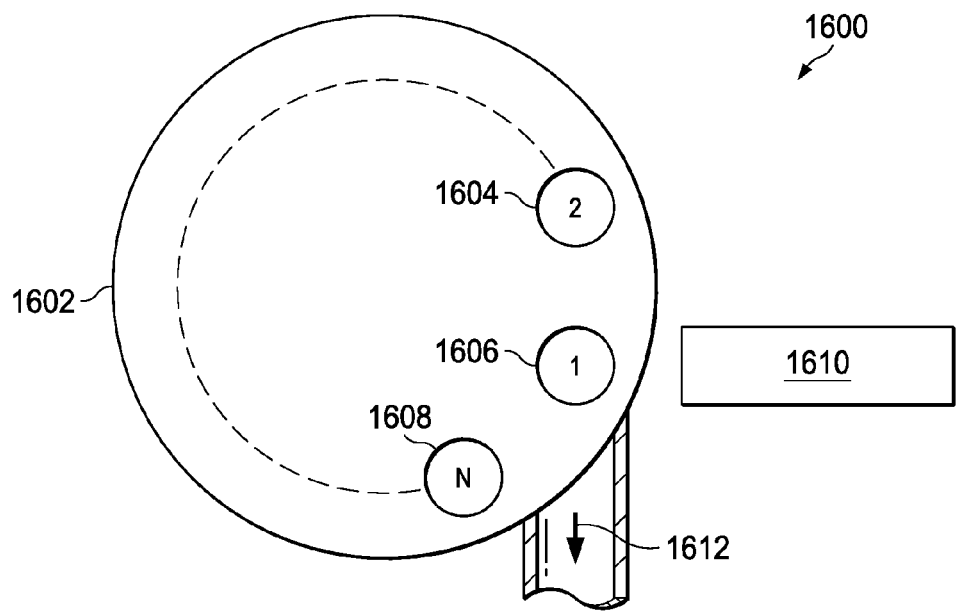
FIG. 16A is an illustration of dispensing unit, according to one embodiment.
Figure 16B:
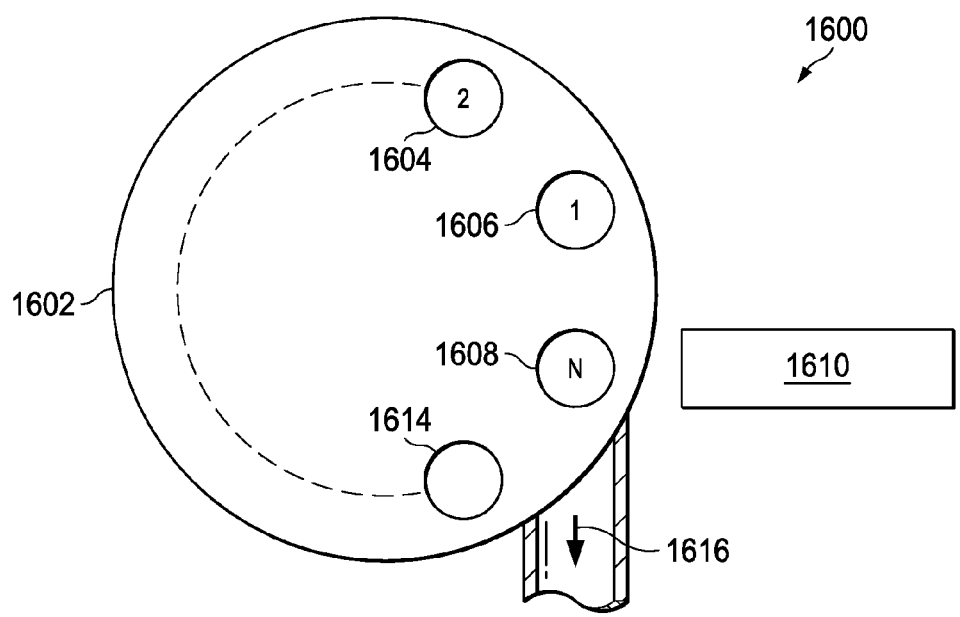
FIG. 16B is an illustration of dispensing unit, according to one embodiment.

In FIG. 16A, another illustration of a dispensing unit with one or more ball functionalities is shown, according to one embodiment. A dispensing system 1600 may one or more dispensing devices 1602, a magnet 1610 (and/or any other movement device and/or initiating device) and one or more dispensing units (a first dispensing unit 1606, a second dispensing unit 1604, a third dispensing unit, a fourth dispensing unit, an Nth−1 dispensing unit, and an Nth dispensing unit 1608. In a first example, an orange flavored drink may be dispensed when the magnet 1610 comes (and/or is energized) into a first relative position to a first dispensing unit 1606 by moving a blocking element which allows for a fluid flow 1612. In a second example, a cherry flavored drink may be dispensed when the magnet 1610 comes (and/or is energized) into a second relative position to a second dispensing unit 1604 by moving a blocking element which allows for the fluid flow 1612. In a third example, a cola flavored drink may be dispensed when the magnet 1610 comes (and/or is energized) into a third relative position to a third dispensing unit by moving a blocking element which allows for the fluid flow 1612. In a fourth example, a lemon flavored drink may be dispensed when the magnet 1610 comes (and/or is energized) into a fourth relative position to a fourth dispensing unit by moving a blocking element which allows for the fluid flow 1612. In an Nth example, a peach flavored drink may be dispensed when the magnet 1610 comes (and/or is energized) into an Nth relative position to an Nth dispensing unit 1608 by moving a blocking element which allows for the fluid to flow. In another example shown in FIG. 16B, a carbonated water unit 1614 may be utilized.

Figure 17:
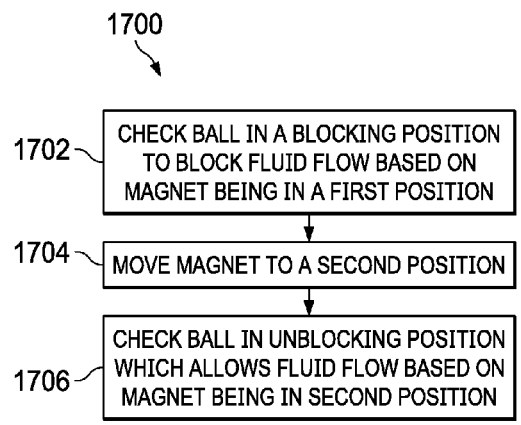
FIG. 17 is a flow diagram of a ball functionality, according to one embodiment.

In FIG. 17, a flow diagram of a ball functionality is shown, according to one embodiment. A method 1700 may include having a check ball (e.g., blocking element, blockage device, etc.) in a blocking position to block a fluid flow based on a magnet being in a first position (step 1702). The method 1700 may include moving the magnet to a second position (step 1704). The method 1700 may include having the check ball in an unblocking position which allows fluid flow (and/or gaseous flow) based on the magnet being in a second position (step 1706).

In one example, the blocking element 204 is positioned over the dispensing element 206 which stops the passage of one or more fluids and/or one or more gases which can be seen in FIG. 1B. In the example shown in FIG. 1B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole). A movement device 220 (e.g., a magnet) is in a first position 220A which does not allow the movement device 220 to interact with the blocking element 204.

Further, the blocking element 204 has moved to a second position relative to the dispensing element 206. In this example, the movement device 220 has moved to a second position 220B which allows the movement device 220 to interact with the blocking element as shown in FIG. 2B. The movement device 220 (e.g., a magnet) has caused the blocking element 204 (e.g., a Ferro-magnetic material and/or a metal ball) to move in a first direction 210 towards the movement device 220 which allows for a first fluid flow 211 to move towards the dispensing element 206 and a second fluid flow 222 through the dispensing element 206 until the movement device is moved back to the first position 220A which causes the blocking element to move back to a position to block the flow of fluids through the dispensing element 206 as shown in FIG. 1B.

Figure 18:
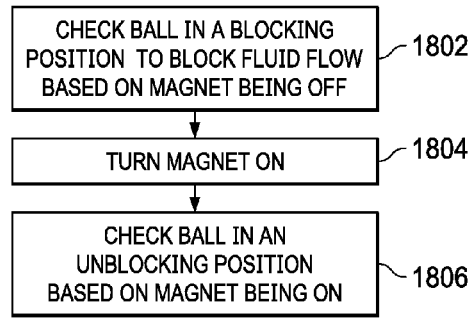
FIG. 18 is a flow diagram of a ball functionality, according to one embodiment.

In FIG. 18, a flow diagram of a ball functionality is shown, according to one embodiment. A method 1800 may include having a check ball (e.g., blocking element, blockage device, etc.) in a blocking position to block fluid flow based on the magnet being off (e.g., de-energized) (step 1802). The method 1800 may include turning the magnet on (e.g., energizing) (step 1804). The method 1800 may include having the check ball in an unblocking position based on the magnet being on (step 1806).

In one example, the blocking element 204 is positioned over the dispensing element 206 which stops the passage of one or more fluids and/or one or more gases which can be seen in FIG. 5B. In the example shown in FIG. 5B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole). A movement device 500 (e.g., a magnet) is in a first state (e.g., de-energized) which does not allow the movement device 500 to interact with the blocking element 204.

Further, the blocking element 204 has moved to a second position relative to the dispensing element 206. In this example, the movement device 500 has been energized and is in a second state 502 which allows the energized movement device 502 to interact with the blocking element as shown in FIG. 6B. The energized movement device 502 (e.g., a magnet) has caused the blocking element 204 (e.g., a Ferro-magnetic material and/or a metal ball) to move in a first direction 210 towards the energized movement device 502 which allows for a first fluid flow 211 to move towards the dispensing element 206 and a second fluid flow 222 through the dispensing element 206 until the energized movement device 502 returns in an de-energized movement device 500 which causes the blocking element to move back to a position to block the flow of fluids through the dispensing element 206 as shown in FIG. 6B.

In another example, the blocking element 204 is positioned over the dispensing element 206 which stops the passage of one or more fluids and/or one or more gases which can be seen in FIG. 7B. In the example shown in FIG. 7B, the blocking element 204 stops a fluid flow because the flow (e.g., line PSI) is putting pressure 208 on the blocking element 204 which creates a seal between the blocking element 204 and the dispensing element 206 (the dispensing element 206 in this example is a hole). A movement device 700 (e.g., a magnet) is in a first state (e.g., de-energized) which does not allow the movement device 700 to interact with the blocking element 204.

Further, the blocking element 204 has moved to a second position relative to the dispensing element 206. In this example, the movement device 700 has been energized and is in a second state 702 which allows the energized movement device 702 to interact with the blocking element as shown in FIG. 8B. The energized movement device 702 (e.g., a magnet) has caused the blocking element 204 (e.g., a Ferro-magnetic material and/or a metal ball) to move in a first direction 704 towards the energized movement device 702 which allows for a first fluid flow 211 to move towards the dispensing element 206 and a second fluid flow 222 through the dispensing element 206 until the energized movement device 502 returns in an de-energized movement device 700 which causes the blocking element to move back to a position to block the flow of fluids through the dispensing element 206 as shown in FIG. 8B.

Figure 19:
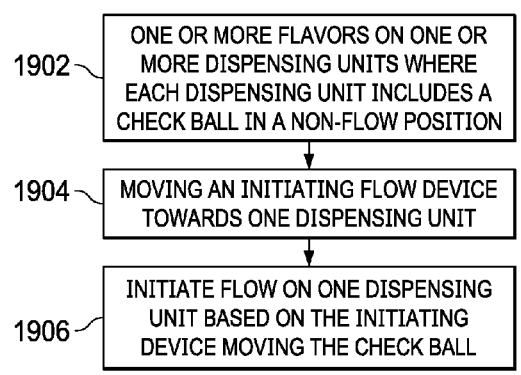
FIG. 19 is a flow diagram of a ball functionality, according to one embodiment.

In FIG. 19, a flow diagram of a ball functionality is shown, according to one embodiment. A method 1900 may include having one or more check balls (e.g., blocking element, blockage device, etc.) in one or more dispensing units which have one or more flavors in a non-flow position (step 1902). The method 1900 may include moving an initiating flow device towards one dispensing unit (step 1904). The method 1900 may include initiating flow on one dispensing unit based on the initiating device moving the check ball (step 1906). In one example, when a person wants a drink that person pushes their cup on the input receiving area 1408 which moves the input device 1406 towards the drink unit 1418. After the input device 1406 (and the magnetic area 1410) come in proximate to the drink unit 1418 (and the blocking element 1416) flow of the fluid is initiated based on the magnetic area 1410 moving the blocking element 1416. Once the person stops pushing the input device 1406, the magnetic area 1410 moves away from the blocking element 1416 and the flow of fluids is stopped by the blocking element 1416.

Figure 20:
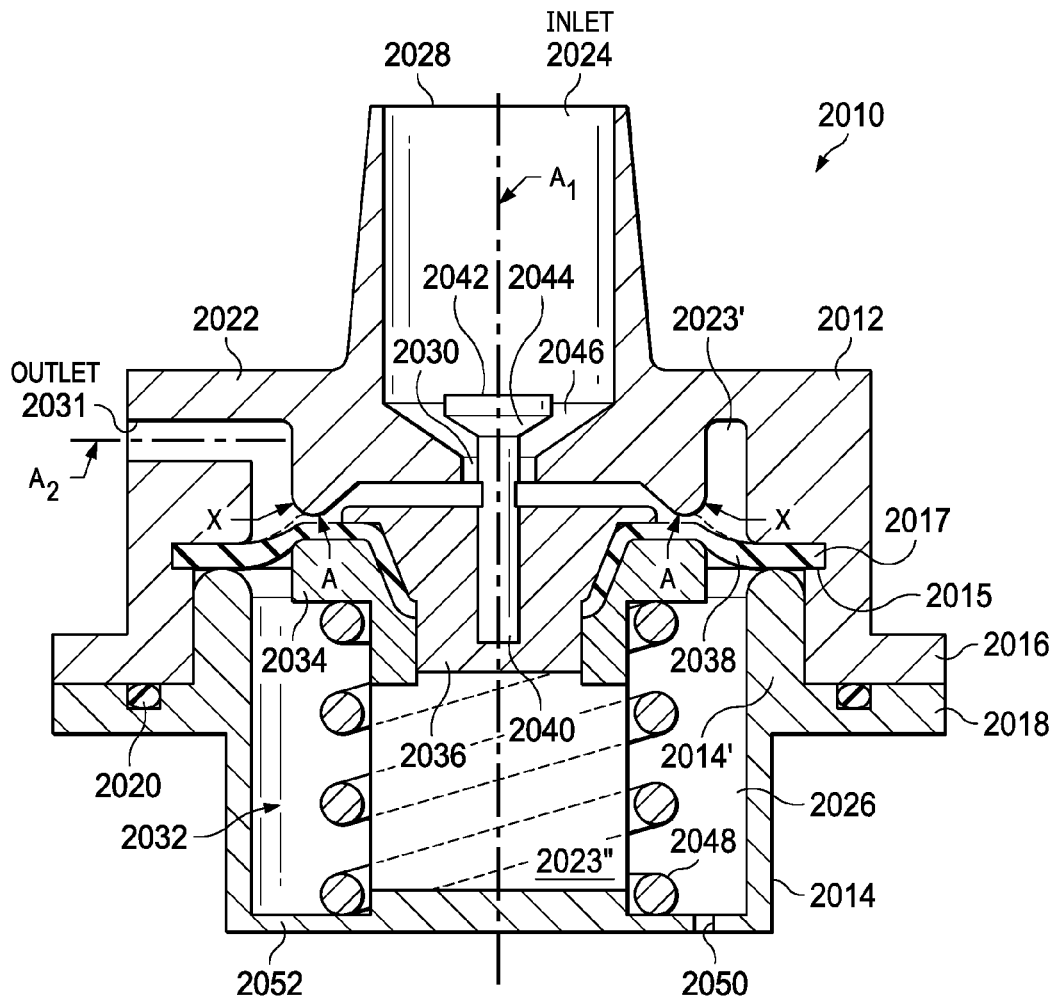
FIG. 20 is an illustration of a CF Valve, according to one embodiment.

In FIG. 20, a regulating valve includes an outer housing comprised of a cap joined to a base. The housing is internally subdivided by a barrier wall into a head section and a base section, the latter being further subdivided by a modulating assembly into a fluid chamber and a spring chamber. An inlet and a 90° outlet (please note outlet angle may be any angle from 0 to 360 degrees) in the cap communicate with the fluid chamber. Fluid at a variable pressure is admitted into the fluid chamber via the inlet, with the modulating assembly serving to maintain the fluid exiting the fluid chamber via the outlet at a substantially constant pressure.

This disclosure relates generally to fluid valves, and is concerned in particular with a regulating valve that is normally closed, that is opened by a variable fluid pressure above a selected threshold level, and that when open, serves to deliver the fluid at a constant pressure and flow rate The drawing in FIG. 20 is a sectional view through a regulating valve in accordance with the present disclosure, the valve being shown is in its open condition.

With reference to the drawing, a regulating valve in accordance with the present disclosure is generally depicted at 2010. The valve includes an outer housing having a cap 2012 joined to a cup-shaped base 2014 at mating exterior flanges 2016, 2018, with an O-ring seal 2020 interposed there between.

The housing is internally subdivided by a barrier wall 2022 into a head section 2024 and a base section 2026. An inlet 2028 in the cap 2012 is adapted to be connected to a fluid supply (not shown) having a pressure that can vary from below to above a threshold level. The inlet 2028 and a central port 2030 in the barrier wall 2022 are aligned along a central axis A1 of the valve. An outlet port 2031, also in the cap 2012, is aligned on a second axis A2 transverse to the first axis A1.

A modulating assembly 2032 cooperates with the barrier wall 2022 to subdivide the base section into a fluid chamber 2031 segregated from a spring chamber 2023". The modulating assembly serves to prevent fluid flow through the valve when the fluid pressure at the inlet 2028 is below the threshold pressure.

When the fluid pressure at the inlet exceeds the threshold pressure, the modulating assembly serves to accommodate fluid flow from the head section 2024 through port 2030 into chamber 2023' at a constant pressure and flow rate, and from there through outlet port 2031. Either the outlet port 2031 or a downstream orifice or flow restrictor (not shown) serves to develop a back pressure in fluid chamber 2023'.

The modulating assembly 2032 includes a piston comprised of a hollow shell 2034 and a central plug 2036. The piston is supported for movement in opposite directions along axis A1 by a flexible annular diaphragm 2038. The inner periphery of the diaphragm is captured between the shell 2034 and plug 2036. The cup shaped base 2014 has a cylindrical wall segment 2014' received within the cap 2012. The outer periphery of the diaphragm is captured between an upper rim 2015 of the wall segment 2014' and an inwardly projecting interior ledge 2017 on the cap.

A stem 2040 on the piston plug 2036 projects through the port 2030 into the head section 2024. An enlarged head 2042 on the stem has a tapered underside 2044 that coacts with a tapered surface 2046 of the barrier wall to modulate the size of the flow path through the port 2030 as an inverse function of the varying fluid pressure in the input section, with the result being to deliver fluid to the outlet 2031 at a constant pressure and flow rate.

A compression spring 2048 in the spring chamber 2023" is captured between an underside surface of shell 2034 and the bottom wall 2052 of the housing base 2014. The spring urges the modulating assembly 2032 towards the barrier wall 2022. When the fluid pressure at the inlet 2028 is below the threshold pressure, spring 2048 serves to urge the diaphragm 2038 against the barrier wall 2022, thus preventing fluid flow from the fluid chamber 2023' to the outlet 2031'. As the fluid pressure exceeds the threshold pressure, the resilient closure force of spring 2048 is overcome, allowing the piston assembly to move away from the barrier wall, and allowing the modulating function of the coacting tapered surfaces 2044, 2046 to commence. An opening 2050 in the bottom wall 2052 serves to vent the volume beneath diaphragm 2038 to the surrounding atmosphere.

In one example, a regulating valve for receiving fluid at a variable pressure from a fluid source and for delivering the fluid at a substantially constant pressure and flow rate to a fluid applicator or the like, the valve including: a cup-shaped base having a cylindrical wall segment terminating in an upper rim, and an externally projecting first flange; a cap having an inwardly projecting ledge and an externally projecting second flange, the cup-shaped base and the cap being configured and dimensioned for assembly as a unitary housing, with the cylindrical wall segment of the cup-shaped base inserted into the cap, and with the extent of such insertion being limited by the abutment of the first flange with the second flange to thereby provide a space between the upper rim of the cup-shaped base and the inwardly projecting ledge of the cap; a barrier wall subdividing the interior of the housing into a head section and a base section; a modulating assembly subdividing the base section into a fluid chamber and a spring chamber; an inlet in the cap for connecting the head section to the fluid source; a port in the barrier wall connecting the head section to the fluid chamber, the port being aligned with a central first axis of the valve; an outlet in the cap communicating with the fluid chamber, the outlet being aligned on a second axis transverse to the first axis; a stem projecting from the modulating assembly along the first axis through the port into the head section; a flexible diaphragm supporting the modulating assembly within the housing for movement in opposite directions along the first axis, the diaphragm having an outer periphery captured in the space between the inwardly projecting ledge of the cap and a rim of the cylindrical wall segment of the cup-shaped base; a spring in the spring chamber, the spring being arranged to resiliently urge the modulating assembly into a closed position at which the diaphragm is in sealing contact with the barrier wall to thereby prevent fluid flow from the head section via the port and fluid chamber to the outlet, the spring acting in concert with the modulating assembly and the stem projecting therefrom to modulate the size of the port as an inverse function of the variable fluid pressure in the input sections whereby the pressure and flow rate of the fluid delivered to the outlet is maintained substantially constant, the valve being automatically actuated when the pressure of the fluid acting on the modulating assembly exceeds a threshold level, and being automatically closed when the pressure drops below the threshold level.

Figure 21:
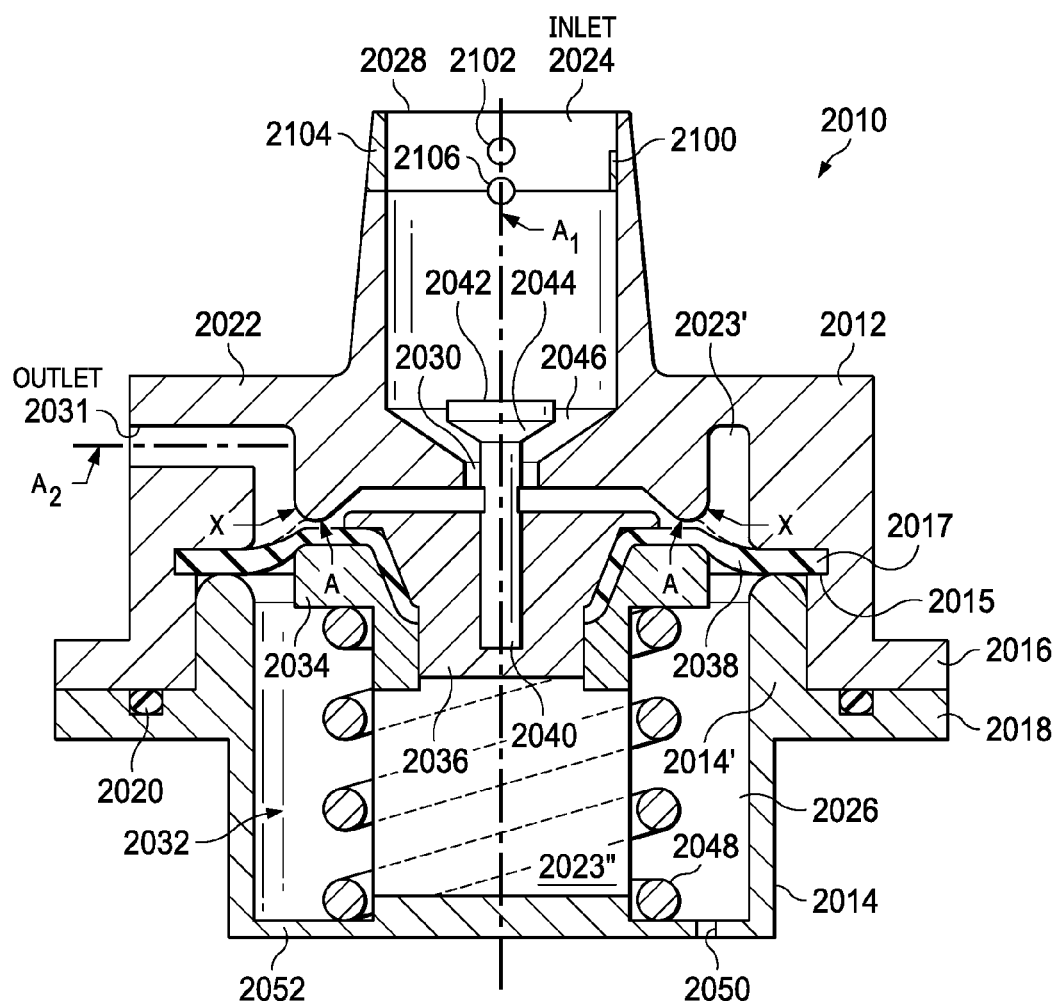
FIG. 21 is another illustration of a CF Valve, according to one embodiment.

In FIG. 21, a magnetically activated ball valve device 2100 has been added to regulating valve 2010 where the magnetically activated ball valve device 2100 is located in a position relative to the inlet (e.g., incoming fluid). In this example, the magnetically activated ball valve device 2100 includes an opening 2106, a ball 2102, and a magnetic device 2104. Additional embodiments of the magnetically activated ball valve device 2100 and the functionality of the magnetically activated ball valve device 2100 are shown in other figures of this disclosure. In other embodiments, the ball valve device 2100 may be activated by the fluid flow, mechanical functionality (e.g., levers, etc.), magnetic functionality, and/or any combination of movement devices.

Figure 22:
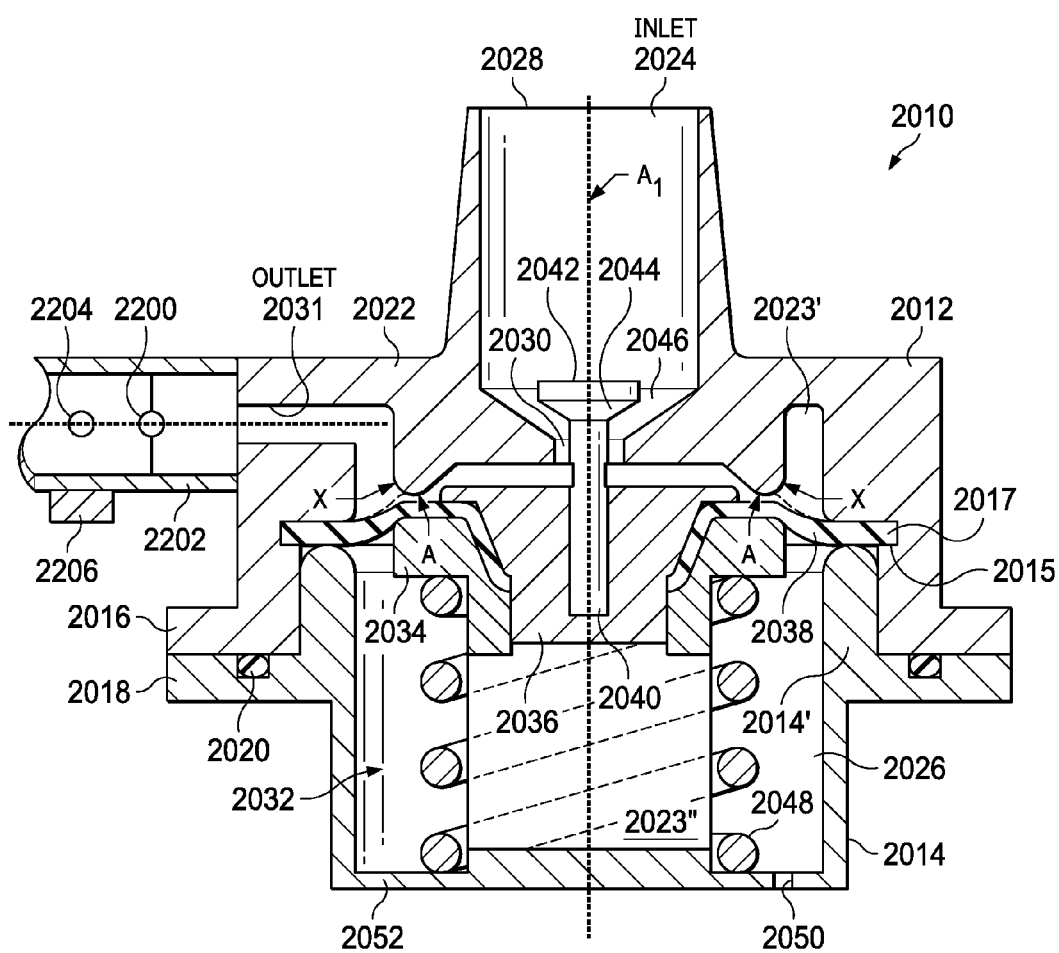
FIG. 22 is another illustration of a CF Valve, according to one embodiment.

In FIG. 22, a magnetically activated ball valve device 2202 has been added to regulating valve 2028 where the magnetically activated ball valve device 2202 is located in a position relative to the outlet (e.g., outgoing fluid). In this example, the magnetically activated ball valve device 2202 includes an opening 2200, a ball 2204, and a magnetic device 2206. Additional embodiments of the magnetically activated ball valve device 2202 and the functionality of the magnetically activated ball valve device 2202 are shown in the other figures of this disclosure.

A constant flow regulating valve includes a closure mechanism configured and arranged to override the modulating mode of the valve and to close the valve at fluid inlet pressures both below and above the valve's threshold level. The closure mechanism may be selectively deactivated to thereby allow the valve to assume its normal pressure responsive regulating functions. Embodiments of the regulating valve incorporate pressure relief devices and vent seals, with configurations suitable for incorporation into the trigger assemblies of portable sprayers.

This disclosure relates generally to fluid valves, and is concerned in particular with a regulating valve that operates in response to a variable fluid inlet pressure above a selected threshold level to deliver the fluid at a constant outlet pressure and flow rate. A closure mechanism is selectively operable either to accommodate the valve's normal pressure responsive regulating functions, or to override such functions by maintaining the valve in a closed state at inlet pressures both above and below the threshold level.

In one example, valves are normally closed in response to fluid inlet pressures below a threshold level, and operate in a modulating mode in response to variable fluid inlet pressures above the threshold level to deliver fluids at constant outlet pressures and flow rates. However, at fluid inlet pressures above the threshold level, such valves remain open and cannot serve as shut off valves, thus making it necessary to employ additional and separately operable valves to achieve this added function.

In accordance with one aspect of the present disclosure, the known regulating valves are modified to include closure mechanisms configured and arranged to override the modulating mode of the valves and to maintain closure of the valves at fluid inlet pressures both below and above the threshold level. The closure mechanisms may be selectively deactivated to thereby allow the valves to assume their normal pressure responsive regulating functions.

In accordance with still another aspect of the present disclosure, the vent opening communicating with the valve's spring chamber is provided with a seal which allows air to escape and enter the spring chamber, but which prevents the escape of liquid from the spring chamber in the event that the valve diaphragm is breached.

In accordance with another aspect of the present disclosure, a pressure relief mechanism is provided for relieving residual fluid inlet pressure below the threshold level when the valve is closed.

In accordance with another aspect of the present disclosure, multiple valve components are preassembled into integral subassemblies that are configured and arranged for final assembly into an outer housing structure.

In accordance with a further aspect of the present disclosure, the valve is integrated into the trigger assembly of a portable sprayer.

Figure 23:
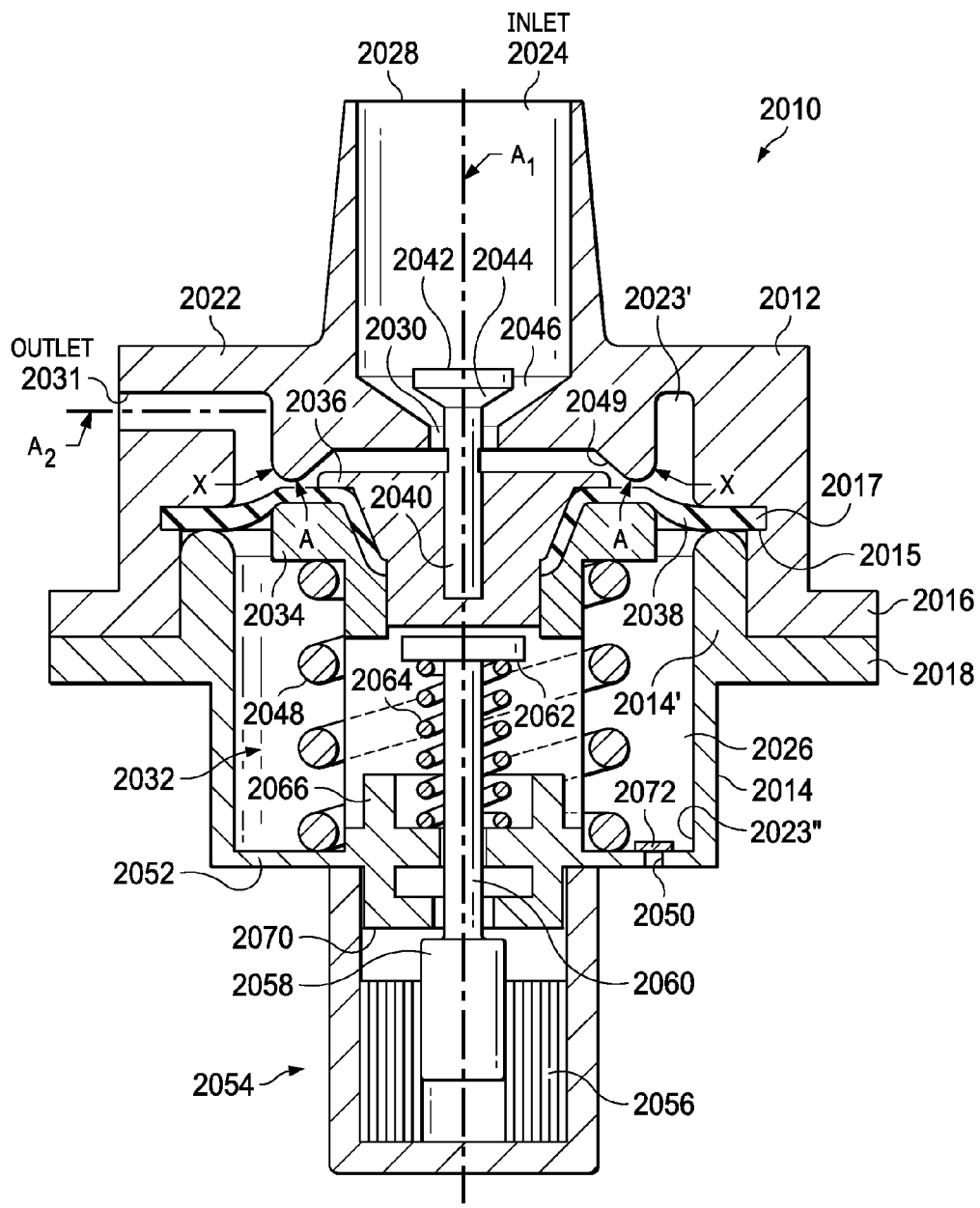
FIG. 23 is another illustration of a CF Valve, according to one embodiment.

With reference initially to FIG. 23, a regulating valve in accordance with the present disclosure is generally depicted at 2010. The valve includes an outer housing having a cap 2012 joined to a cup-shaped base 2014 at mating exterior flanges 2016, 2018.

The housing is internally subdivided by a barrier wall 2022 into a head section 2024 and a base section 2026. An inlet 2028 in the cap 2012 is adapted to be connected to a fluid supply (not shown) having a pressure that can vary from below to above a threshold level. The inlet 2028 and a central port 2030 in the barrier wall 2022 are preferably aligned coaxially with a central axis A1 of the valve. An outlet port 2031 is provided in the cap 2012, and may be aligned on a second axis A2 transverse to the first axis A1. Although the axis A2 is shown at 90° with respect to axis A1, it will be understood that axis A2 may be oriented at other angles with respect to axis A1 in order to suit various applications of the valve.

A modulating assembly 2032 internally subdivides the base section into a fluid chamber 2023' segregated from a spring chamber 2023". The modulating assembly serves to prevent fluid flow through the valve when the fluid pressure at the inlet 2028 is below the threshold pressure. When the fluid pressure at the inlet exceeds the threshold pressure, the modulating assembly serves to accommodate fluid flow from the head section 2024 through port 2030 into fluid chamber 2023' and from there through outlet port 2031 at a substantially constant outlet pressure and flow rate. Either the outlet port 2031 or a downstream orifice or flow restrictor (not shown) serves to develop a back pressure in fluid chamber 2023'.

The modulating assembly 2032 includes a piston comprised of a hollow shell 2034 and a central plug 2036. The piston is supported for movement in opposite directions along axis A1 by a flexible annular diaphragm 2038. The inner periphery of the diaphragm is captured between the shell 2034 and plug 2036. The cup shaped base 2014 has a cylindrical wall segment 2014' received within the cap 2012. The outer periphery of the diaphragm is captured between an upper rim 2015 of the wall segment 2014' and an inwardly projecting interior ledge 2017 on the cap. The outer periphery of the diaphragm thus serves as an effective seal between the cap 2012 and base 2014.

A stem 2040 on the piston plug 2036 projects through the port 2030 into the head section 2024. An enlarged head 2042 on the stem has a tapered underside 2044 that coacts with a tapered surface 2046 of the barrier wall to modulate the size of the flow path through the port 2030 as an inverse function of the varying fluid pressure in the input section, with the result being to deliver fluid to the outlet 2031 at a substantially constant pressure and flow rate.

A compression spring 2048 in the spring chamber 2023" is captured between an underside surface of shell 2034 and the bottom wall 2052 of the housing base 2014. The spring urges the modulating assembly 2032 towards the barrier wall 2022. When the fluid inlet pressure is below the threshold pressure, spring 2048 serves to urge the diaphragm 2038 against a sealing ring 2049 on the underside of the barrier wall 2022, thus preventing fluid through flow from the head section 2024 via port 2030 and fluid chamber 2023' to the outlet 2031. As the fluid inlet pressure exceeds the threshold pressure, the resilient closure force of spring 2048 is overcome, allowing the modulating assembly to move away from the sealing ring 2049, and allowing the modulating function of the coacting tapered surfaces 2044, 2046 to commence. An opening 2050 in the bottom wall 2052 serves to vent the volume beneath diaphragm 2038 to the surrounding atmosphere.

An operating means includes a solenoid 2054 fitted to the underside of the cup-shaped base 2014. The solenoid includes a magnet 2056 surrounding a magnet core 2058. A rod 2060 projects from the magnet core along axis A1 into the spring chamber 2023" where it terminates in a flat head 2062. A closure means includes a second compression spring 2064 surrounding the rod 2060 and captured between the head 2062 and an annular interior boss 2066 on the bottom wall 2052 of the base 2014. The closure force of spring 2064 exceeds that of spring 2048.

In the condition shown in the drawing, the magnet 2056 has been energized to axially withdraw the core 2058, thus pulling the head 2062 downwardly against the compressive force of spring 2064 and away from the underside of plug 2034. This allows the modulating assembly 2032 to perform its normal pressure regulating functions as described above.

If the magnet 2056 is de-energized, the spring 2064 will serve to push the head 2062 up against the bottom of plug 2034 with a closure force sufficient to override the valve's normal regulating functions, resulting in the diaphragm assembly 2032 being elevated to press the diaphragm 2038 against the circular downwardly projecting sealing ring 2049 on the barrier wall 2022. This in turn prevents fluid through flow from head section 2024 via port 2030 and fluid chamber 2023' to the outlet port 2031. A circular ledge 2070 serves as a stop to limit upward movement of the core 2058, thus safeguarding the diaphragm 2038 from being pressed too tightly against the sealing ring 2049. The closure force of spring 2064 is sufficient to hold the diaphragm 2038 against the sealing ring 2049 at inlet pressures above the threshold pressure.

Figure 24:
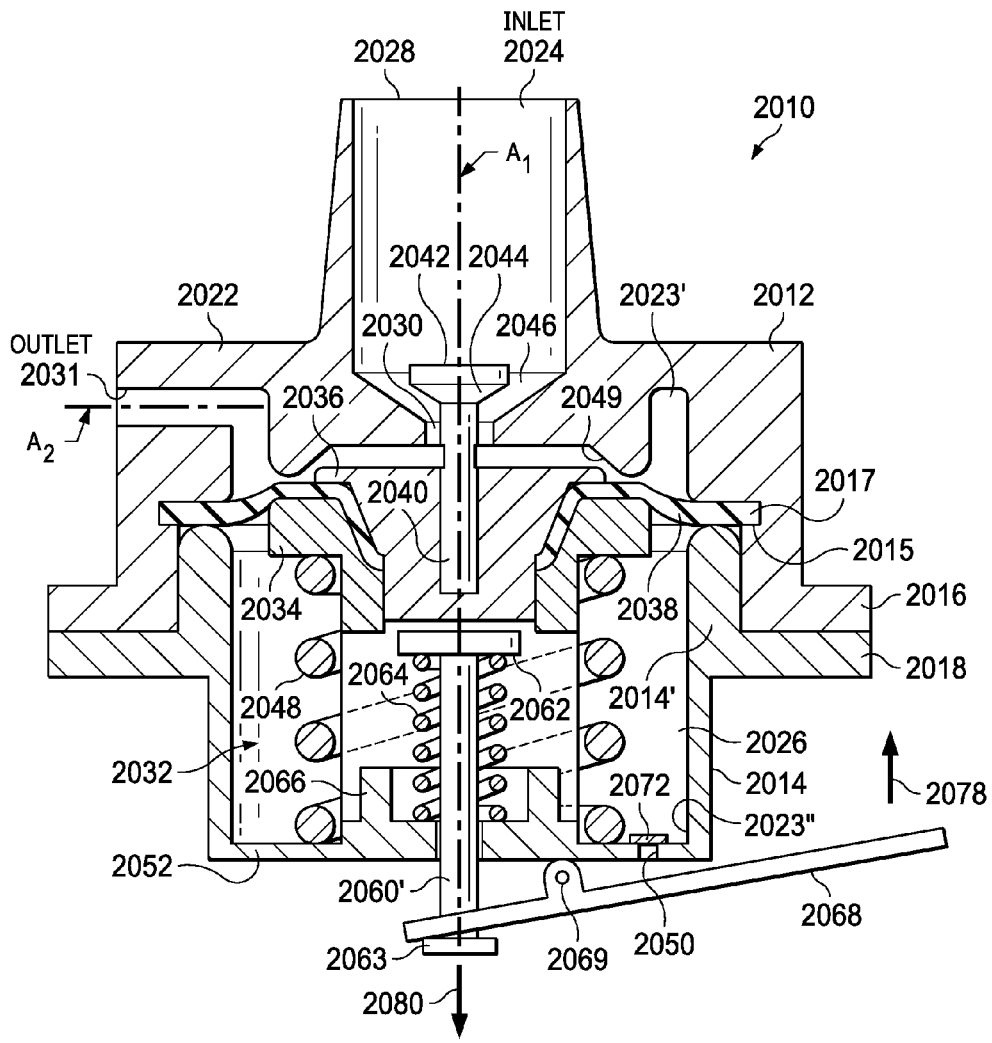
FIG. 24 is another illustration of a CF Valve, according to one embodiment.

In the alternative embodiment shown in FIG. 24, the rod 2060' projects through the bottom wall 2052 to terminate in a foot 2063 acted upon by a lever 2068 mounted for pivotal movement about a pin 2069 or the like. Moving the lever up causes the rod 2060' to be pulled downwardly.

In light of the foregoing, it will be seen that the valve 2010 can serve as a shut off valve by simply allowing the spring 2064 to override spring 2048 and maintain the diaphragm 2038 of the modulating assembly 2032 in sealing contact with the ring 2049 on barrier wall 2022. By deactivating the closure force of spring 2064, either by energizing the solenoid 2054 of FIG. 23 or manually operating lever 2068 of FIG. 24, the valve is conditioned to assume its normal pressure responsive regulating function at inlet pressures above the threshold level.

Figure 25:
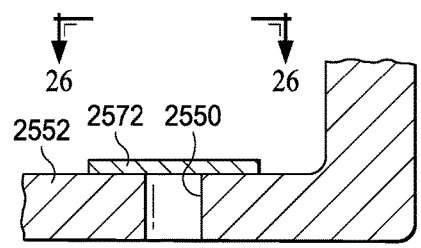
FIG. 25 is another illustration of a CF Valve, according to one embodiment.
Figure 26:
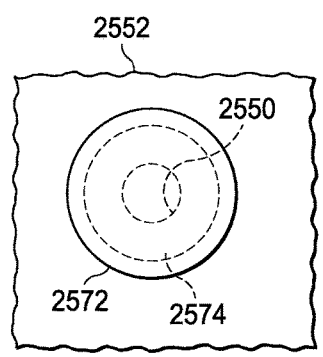
FIG. 26 is another illustration of a CF Valve, according to one embodiment.

As can be best seen by additional reference to FIGS. 25 and 26, a gas permeable hydrophobic seal 72 overlies the vent opening 50. The seal may comprise an expanded polytetraflouroethelene (ePTFE) film, or any other gas permeable hydrophobic membrane that allows air to escape from and reenter the spring chamber 23", but that in event of failure of the diaphragm 38 and entry of liquid into the spring chamber, will prevent liquid from leaking to the exterior of the valve via the vent opening 50. The seal 72 may be adhered or heat sealed to the bottom wall 52 as at 74. Although not shown, the seal may be reinforced, if necessary, by an additional porous membrane, e.g., a woven fabric or the like.

Figure 27:
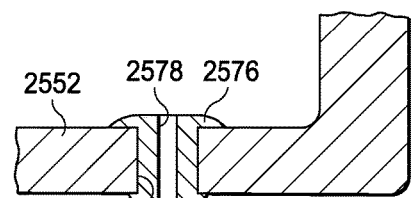
FIG. 27 is another illustration of a CF Valve, according to one embodiment.

FIG. 27 depicts an alternative embodiment of the vent seal in which a bushing 76 has been snap fitted into the vent opening 50. The bushing is molded of a hydrophilic polymer that absorbs water and swells, resulting in closure of the restricted central vent passageway 78. This again serves to prevent leakage in the event of failure of the diaphragm 38.

Figure 28:
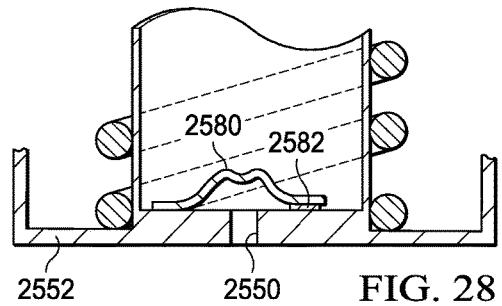
FIG. 28 is another illustration of a CF Valve, according to one embodiment.
Figure 29:
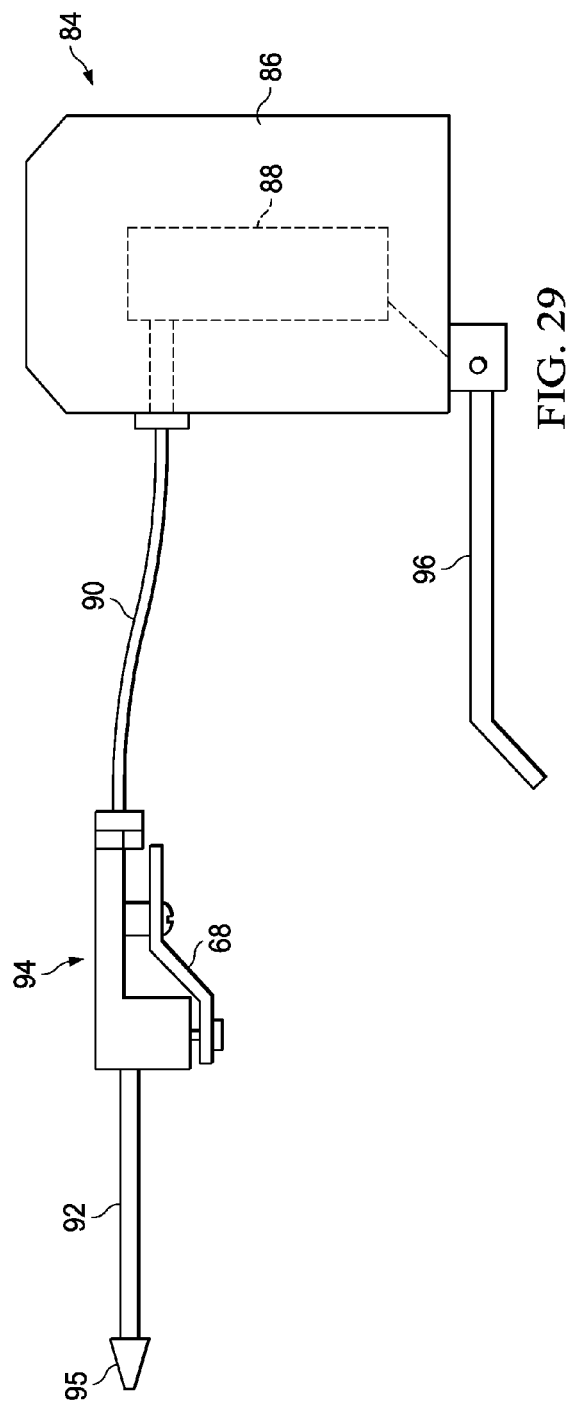
FIG. 29 is an illustration of a dispensing unit, according to one embodiment.

FIG. 28 depicts still another alternative embodiment of the vent seal in which the vent opening 50 is located at the center of bottom wall 52. A flexible sealing diaphragm 80 of some material that is impervious to both liquids and air is adhered or heat sealed as at 82 over the vent opening. As air pressure in the spring chamber 23" varies in response to flexure of the main diaphragm 38, the sealing diaphragm 80 will respond flexibly, while at all times maintaining a sealing relationship which will prevent liquid from escaping through the vent opening.

It thus will be seen that the seals 72, 76 and 80 serve as safeguards against leakage of liquid from the regulating valve through vent opening so in the event that the diaphragm 38 is breached.

The regulating valves of the present disclosure are adaptable to widespread usage, a non-limiting example being to stabilize the pressure and flow of the liquid sprays emitted by portable sprayers.

Portable sprayers include both knapsack sprayers and compression sprayers. In the conventional knapsack sprayer, a lever actuated pump is manually operated to withdraw liquid from a non-pressurized portable tank and to deliver the liquid through a wand to a nozzle from which the liquid is expelled in a spray pattern. In a compression sprayer, the tank is pressurized to achieve the same result. In both cases, the delivery pressure varies over a wide range, which affects the liquid spray pattern. Too little pressure produces excessively large wasteful spray droplets, whereas excessive pressure operates in the reverse manner to produce an overly atomized spray which can easily drift from the intended target.

Some attempt at control is provided by manually operating trigger assemblies interposed in the flow path between the tank and nozzle. However, experience has proven that operators are unable to operate such trigger assemblies in a manner which reliably produces substantially uniform delivery pressures and liquid flow rates to the spray nozzles. Thus, spray patterns remain erratic; resulting in wasteful excessive liquid application and/or inadequate overly atomized sprays which often drift dangerously from their intended targets.

Figure 31:
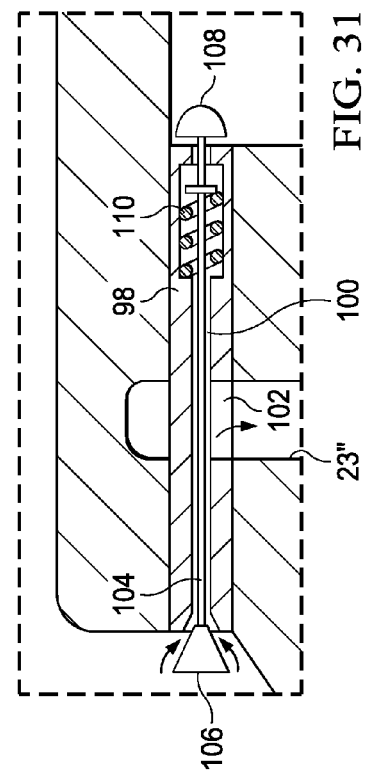
FIG. 31 is an illustration of a dispensing unit, according to one embodiment.
Figure 30:
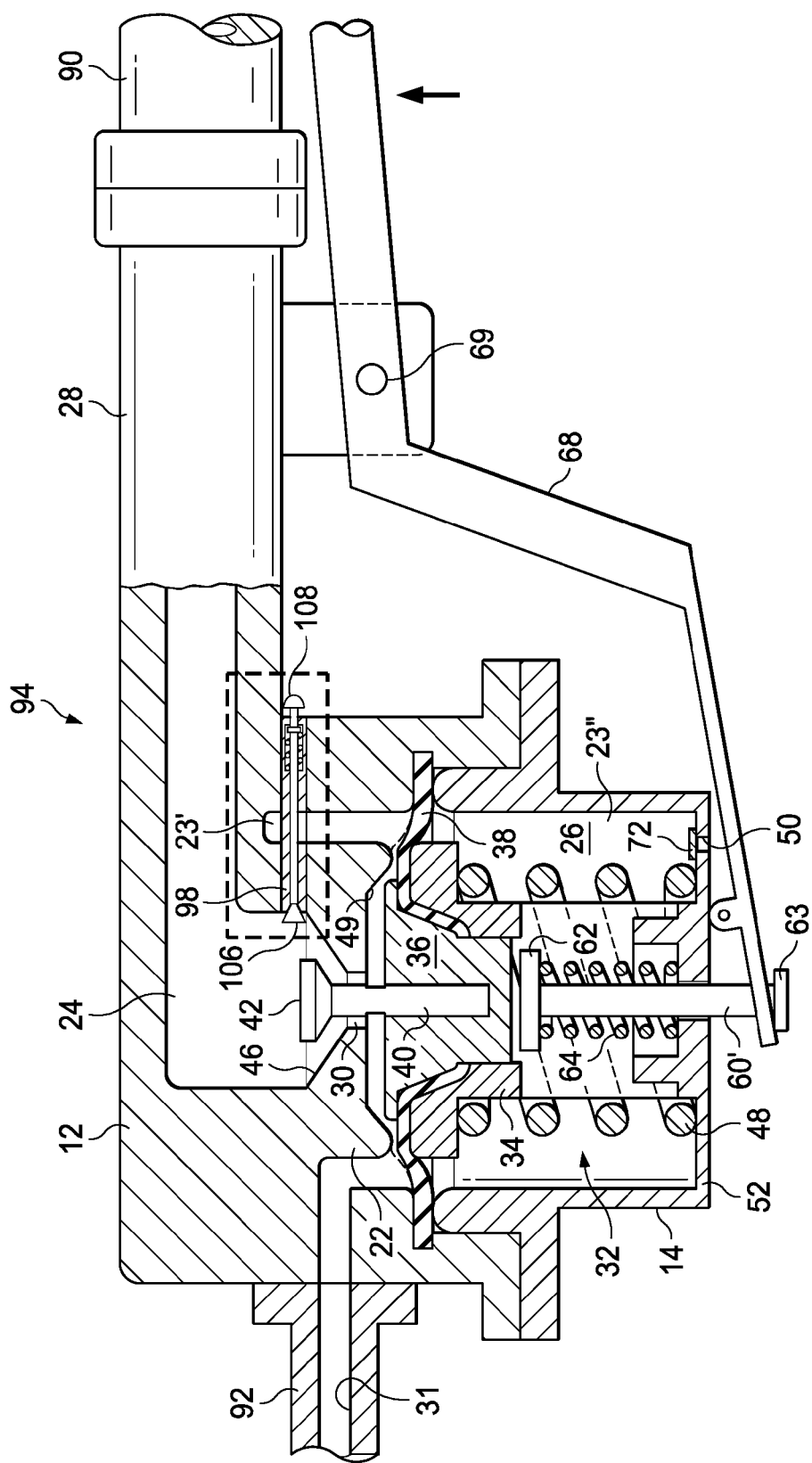
FIG. 30 is an illustration of a dispensing unit, according to one embodiment.

In order to address these problems, and with reference to FIGS. 30-32, a knapsack sprayer 84 includes a tank 86 adapted to contain a liquid, typically a pesticide, herbicide or the like. A pump 88 is mounted within the tank, with an inlet submerged in the liquid, and an outlet connected to a flexible hose 90 leading to trigger assembly 94 incorporating a selectively actuated regulating valve in accordance with the present disclosure. The trigger assembly 94 is in turn connected to a wand 92 having a nozzle 95 at its distal end. The pump 88 is operated by a pivotal lever 96 which is manually manipulated by an operator to withdraw liquid from the tank 86 and to deliver the liquid at a variable pressure via the hose 90 to the trigger assembly 94. Although not shown, it will be understood that the pressurized tank of a compression sprayer would operate in a similar manner to deliver fluid at a variable pressure.

The trigger assembly 94 incorporates a regulating valve similar to that illustrated in FIG. 24, with minor modifications to accommodate its positioning in the liquid flow path between the hose 90 and wand 92. For example, the head section 24 has been reconfigured with a 90° turn to position the inlet 28 for connection to the hose 90, the shape and pivotal connection of the operating lever 68 has been appropriately modified to serve as the trigger, and the outlet port has been connected to the wand 92.

The regulating valve of the trigger assembly 94 is held closed by the force of spring 64. The closure force of spring 64 is relieved by depressing the trigger 68, and in response to pump pressures above the preset threshold level, the valve operates as described previously to maintain a substantially constant delivery pressure and flow rate via the wand 92 to the nozzle 95. By maintaining a substantially constant pressure and flow rate to the nozzle 95, the selected spray pattern remains stable irrespective of variations in the pressure and flow rate of the liquid exiting tank 86.

The regulating valve of the trigger assembly 94 may be additionally modified to include pressure relief means for relieving residual internal pressures in the head section 24 when the valve is closed and either disassembly is required for cleaning and maintenance, or when the trigger assembly is disconnected from the hose 90. To this end, a sleeve 98 is inserted in the cap 12. The sleeve provides a vent path 100 extending from an entry opening communicating with the head section 24 to a side exit opening 102 communicating with the fluid chamber 23'. A pin 104 extends through the sleeve and terminates at opposite ends in enlarged shaped closure and operating heads 106, 108 located respectively in head section 24 and at the valve exterior. A spring 110 serves to bias the pin to the right as viewed in the drawings, thus pulling the closure head 106 in the same direction to close off the vent path 100, as shown in FIG. 31. The vent path is opened by depressing operating head 108 to shift pin in the opposite direction, as shown in FIG. 32, thus opening the vent path and allowing pressurized liquid in the head section 24 to be bled through opening 102 to the fluid chamber 23' from which it can exit through outlet port 31 to the wand 92.

Figure 34:
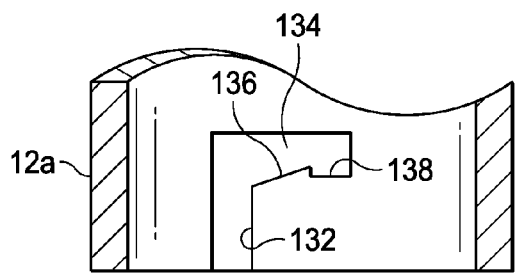
FIG. 34 is an illustration of a dispensing unit, according to one embodiment.

With reference additionally to FIGS. 32-34, another embodiment of a regulating valve is accordance with the present disclosure is depicted at 94 a. The components of valve 94 a that are the same or equivalent to those of value 94 depicted in FIG. 30 have been identified with the same reference numerals with "a" as an added identify.

In this embodiment, the cap 12 a serves as an outer housing structure. The cap 12 a has a bottom opening 112 and an internal circular land 114 grooved to accept an O-ring seal 118. The bottom opening 112 and circular land 114 are aligned on a central axis A1. The barrier wall 22 a is separate from the cap 12 a and has a circular rim 120 adapted to be seated in sealing engagement against the O-ring seal 118.

The modulating assembly 32 a again includes a piston comprised of a hollow shell 34 a and a central plug 36 a. The piston is supported for movement along axis A1, by a flexible diaphragm 38 a. The inner periphery of the diaphragm is captured between the shell 34 a and plug 36 a, and the outer periphery of the diaphragm has a beaded edge captured in an internal groove in a cylindrical skirt 122 having a circular bottom edge 124.

A preassembled first subassembly 126 includes the shell 34 a, central plug 36 a, diaphragm 38 a, skirt 122, barrier wall 22 a and the stem 40 a.

A preassembled second subassembly 128 includes the cup-shaped base 14 a, compression springs 48 a and 64 a, and the operating rod 60 a.

The valve 94 is an assembled by first seating the O-ring seal 118 in the groove 116 of the interior land 114. The first subassembly 126 is then inserted through bottom opening 112 of the cap to seat its rim 120 against the O-ring seal 118.

A compressible annular seal 130 is then inserted via opening 112 and located against the bottom of the diaphragm 38 a.

The second subassembly 128 is then inserted through bottom opening 112. As shown in FIG. 31, the interior wall of the cap 12 is provided with oppositely disposed vertical grooves 132 leading to horizontal grooves 134. The grooves 134 have ramped bottoms 136 leading to notches 138. The cup-shaped base 14 has an oppositely disposed radially projecting ears 140.

Figure 35B:
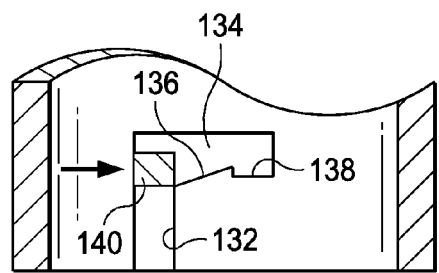
FIG. 35B is an illustration of a dispensing unit, according to one embodiment.
Figure 35A:
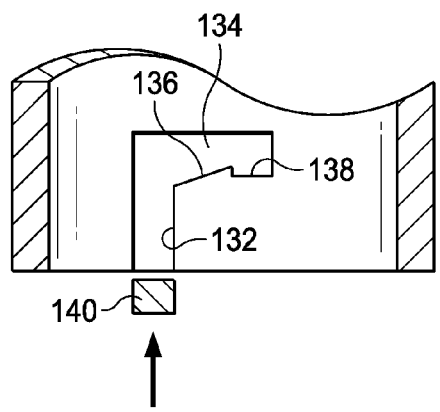
FIG. 35A is an illustration of a dispensing unit, according to one embodiment.
Figure 35C:
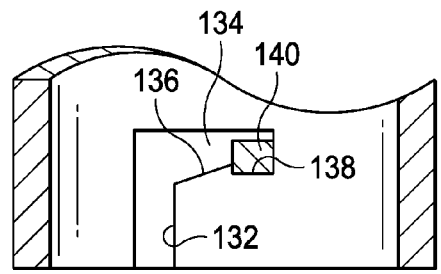
FIG. 35C is an illustration of a dispensing unit, according to one embodiment.

As the second subassembly 128 is inserted, the ears 140 of the cup-shaped base 14 a enter the vertical slots 132 (FIG. 35A). When an internal ledge 141 adjacent to the upper rim of the cup-shaped base 14 a initially contacts the seal 130, the ears 140 are positioned as shown in FIG. 35B. The cup-shaped base is then rotated to shift the ears up the ramped bottoms 136 and into snapped engagement in the notches 136, as shown in FIG. 35C. The second subassembly is then securely locked in place, with the seal 130 compressed between the underside of the diaphragm 38 a and the ledge 141.

The trigger 68 may then be operatively connected to the cap 12 a and rod 60 a' to complete the assembly.

It will be understood that the second subassembly 128 may be secured in place by other means, including for example solvent welding or a threaded connection. Preassembly of the first and second subassemblies advantageously simplifies final assembly of the regulating valves.

In one embodiment, a regulating valve for receiving fluid at a variable inlet pressure from a fluid source and for delivering the fluid at a substantially constant outlet pressure and flow rate to a fluid applicator or the like, the valve may include: a housing internally subdivided by a barrier wall into a head section and a base section; a port in the barrier wall; a modulating assembly internally subdividing the base section into a fluid chamber and a spring chamber, the modulating assembly having a stem projecting along an axis through the port into the head section, and having a flexible diaphragm supporting the modulating assembly for movement in opposite directions along the axis; an inlet in the housing for connecting the head section to the fluid source; an outlet in the housing communicating with the fluid chamber; a spring in the spring chamber, the spring being responsive to inlet pressures below a threshold level to maintain the modulating assembly against the barrier wall and to thereby prevent fluid through flow from the head section via the port and fluid chamber to the outlet, the spring being yieldably responsive to inlet pressures above the threshold level to thereby accommodate movement of the modulating assembly away from the barrier wall, with an accompanying fluid through flow from the head section via the port and the fluid chamber to the outlet, and with the stem serving to modulate the size of the flow path through the port as an inverse function of variations in the inlet pressure above the threshold level, whereby the outlet pressure and flow rate is maintained at a substantially constant level; closure means acting independently of the spring, the closure means comprising a rod axially movable between a holding position in contact with and maintaining the modulating assembly against the barrier wall when the inlet pressure is both above and below the threshold level, and a deactivated position spaced from the modulating assembly; and operating means for selectively deactivating the closure means.

In another embodiment of the regulating valve, the rod may be aligned with and axially movable along the axis. In another embodiment of the regulating valve, the rod may be resiliently maintained in the holding position by a second spring having a closure force exceeding the closure force of the first mentioned spring. In another embodiment of the regulating valve, the operating means may include a manually operable lever operatively connected to the rod. In another embodiment of the regulating valve, the operating means may include a solenoid. In another embodiment of the regulating valve, the closure means may include a second spring having a closure force that exceeds the closure force of the first mentioned spring. In another embodiment of the regulating valve, the fluid source is a portable sprayer, and wherein the outlet is connected to a wand leading to a nozzle. In another embodiment of the regulating valve, the portable sprayer is a knapsack sprayer. In another embodiment of the regulating valve, the portable sprayer is a compression sprayer. In another embodiment of the regulating valve, the regulating valve includes pressure relief means for bleeding liquid from the head section into the fluid chamber. In another embodiment of the regulating valve, the pressure relief means comprises a vent path extending from an entry opening communicating with the head section to an exit opening communicating with the fluid chamber, a pin having a closure head in the head section and an operating head located externally of the housing, and a spring for biasing the pin into a closed position at which the closure head closes the entry opening and prevents the passage of liquid from the head section via the vent path to the fluid chamber, the operating head being depressible to overcome the biasing force of the spring to thereby permit liquid to flow from the head section via the vent path to the fluid chamber. In another embodiment of the regulating valve, the housing comprises a cap and a cup-shaped base, the barrier wall and the modulating assembly being preassembled to form a first subassembly received in the cap, and the cup-shaped base and the spring and closure means being preassembled to form a second subassembly received in and operatively coupled to the cap. In another embodiment of the regulating valve, the second subassembly is operatively coupled by snap engagement of the cup-shaped base with the cap. In another embodiment of the regulating valve, the snap engagement results from rotation of the cup-shaped base relative to the cap. In another embodiment of the regulating valve, the regulating valve includes a vent opening in the housing in communication with the spring chamber. In another embodiment of the regulating valve, the regulating valve includes a seal for the vent opening, the seal being adapted to accommodate passage of gas through the vent opening and to prevent the passage of liquid through the vent opening. In another embodiment of the regulating valve, the seal comprises a gas permeable hydrophobic membrane. In another embodiment of the regulating valve, the seal comprises a hydrophobic bushing inserted in the vent opening, the bushing defining a restricted vent passageway that is closed in response to the absorption of liquid by the bushing. In another embodiment of the regulating valve, the seal comprises a flexible diaphragm imperious to both liquids and gases. In another embodiment, a regulating valve for receiving fluid at a variable inlet pressure from a fluid source and for delivering the fluid at a substantially constant outlet pressure and flow rate to a fluid applicator or the like, the valve includes: a housing internally subdivided by a barrier wall into a head section and a base section; a port in the barrier wall; a modulating assembly internally subdividing the base section into a fluid chamber and a spring chamber, the modulating assembly having a stem projecting along an axis through the port into the head section, and having a flexible diaphragm supporting the modulating assembly for movement in opposite directions along the axis; an inlet in the housing for connecting the head section to the fluid source; an outlet in the housing communicating with the fluid chamber; a spring in the spring chamber, the spring being responsive to inlet pressures below a threshold level to maintain the modulating assembly against the barrier wall and to thereby prevent fluid through flow from the head section via the port and fluid chamber to the outlet, the spring being yieldably responsive to inlet pressures above the threshold level to thereby accommodate movement of the modulating assembly away from the barrier wall, with an accompanying fluid through flow from the head section via the port and the fluid chamber to the outlet, and with the stem serving to modulate the size of the flow path through the port as an inverse function of variations in the inlet pressure above the threshold level, whereby the outlet pressure and flow rate is maintained at a substantially constant level, and wherein the housing comprises a cap and a cup-shaped base, the barrier wall and the modulating assembly comprises a first preassembled subassembly adapted to be received in the cap, and the cup-shaped base and the spring comprise a second preassembled subassembly adapted to be received in and operatively coupled to the cap. In another embodiment of the regulating valve, the regulating valve includes a closure means acting independently of the spring for maintaining the modulating assembly against the barrier wall when the inlet pressure is both above and below the threshold level, and operating means for selectively activating the closure means.

Figure 36:
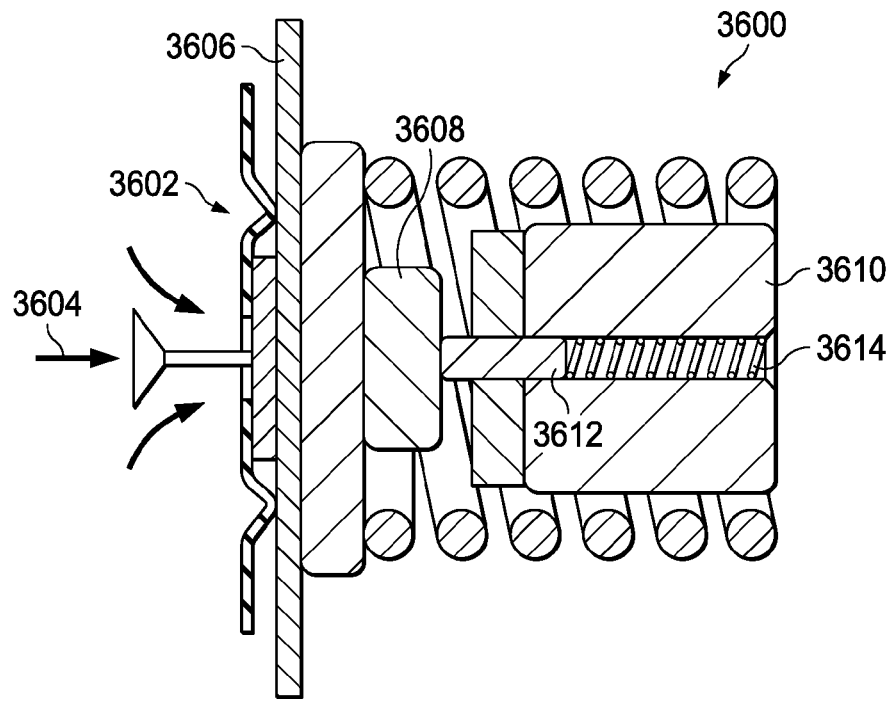
FIG. 36 is another illustration of a CF Valve, according to one embodiment.
Figure 37:
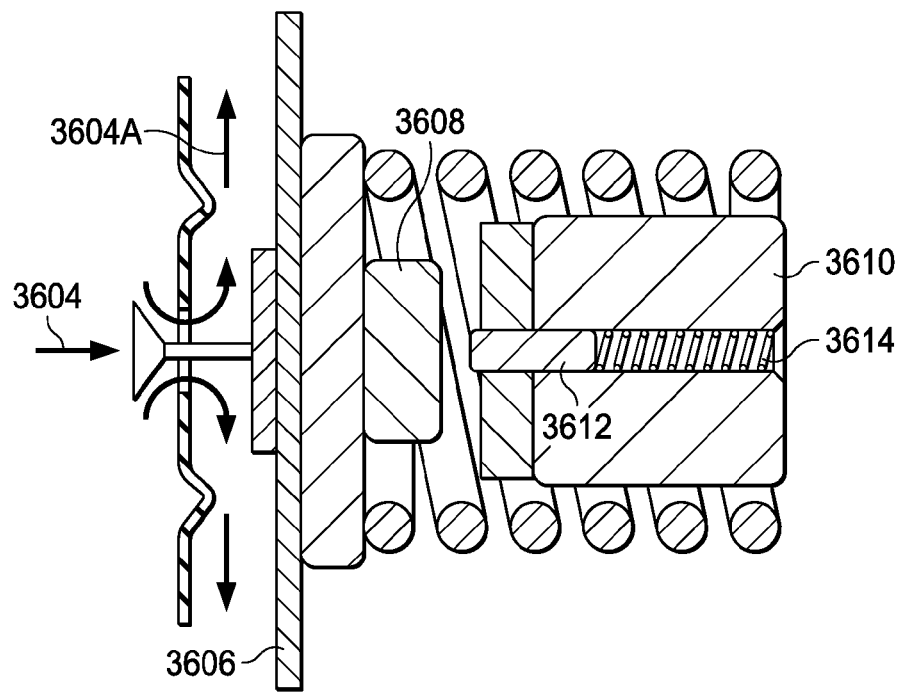
FIG. 37 is another illustration of a CF Valve, according to one embodiment.
Figure 38:
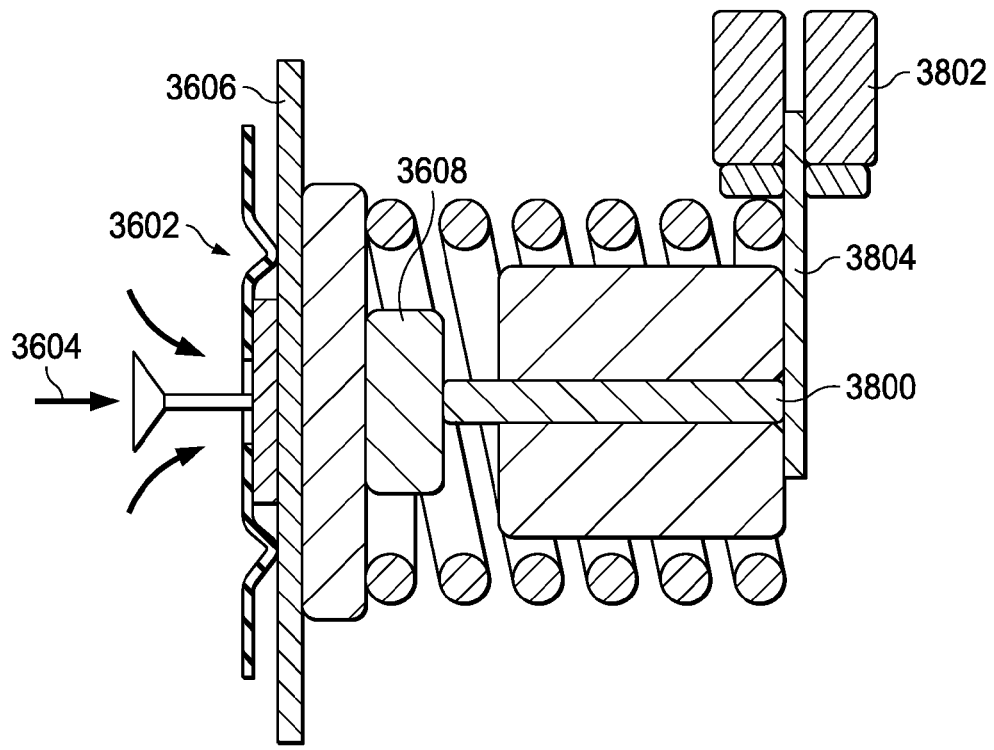
FIG. 38 is another illustration of a CF Valve, according to one embodiment.

In FIG. 36, a valve 3600 in a closed position is shown. The valve 3600 may include a sealing ring 3602, a magnet element 3608, a latching solenoid 3610, and a diaphragm 3606. The latching solenoid 3610 pushes the diaphragm 3606 against the CF valve's sealing ring blocking a flow of fluid 3604. The latching solenoid 3610 may be either permanent magnet or residual magnetism types and with or without a spring assist 3614 for the solenoid plunger 3612. In FIG. 37, a valve 3600 in an open position is shown. In the examples shown in FIGS. 37 and 38, a magnetic element 3608 is utilized to open and close the valve. The solenoid coil energized retracts the plunger 3612 allowing the input pressure to open the CF valve and allow modulation diaphragm to control fluid pressure and flow. In FIG. 38 the CF valve is in a closed position. A second latching solenoid 3802 is latched and mechanically blocking the movement of the plunger 3800 in the latching solenoid 3610. The plunger 3800 is position against the diaphragm which is forced against the sealing ring blocking fluid flow. To operate the CF valve, the second latching solenoid 3802 is activated to retract its plunger 3804 which free the plunger 3800 of the latching solenoid 3610. Then, incoming fluid opens the CF valve and pushes the plunger 3800 back and the diaphragm is free to modulate. To close the CF valve, the latching solenoid is activated and then the second latching solenoid

Figure 39:
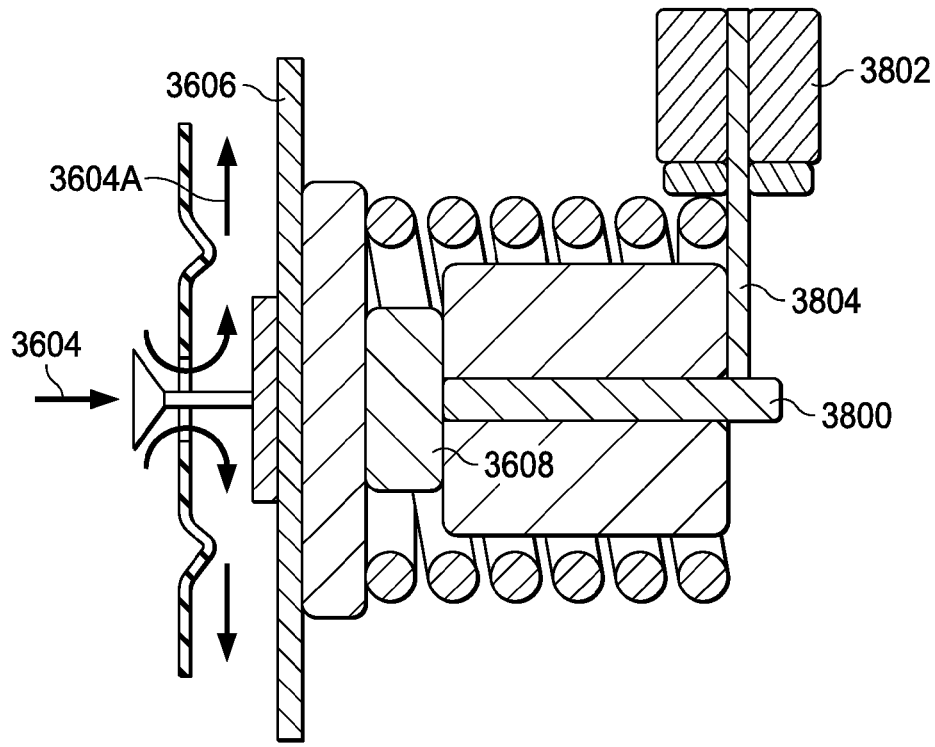
FIG. 39 is another illustration of a CF Valve, according to one embodiment.

3802 is activated and re-latched (after a momentary delay) which locks the diaphragm in the closed position. The mechanical locking device may be configured to several different forms using rods, levers for mechanical advantages. In FIG. 39, a valve 3600 in a closed position is shown. In this example, there is a first solenoid (e.g., solenoid A) and a second solenoid (e.g., solenoid B). In this example, the second solenoid is at a 90 degree angle to the first solenoid which allows the second solenoid to act as a stopper to the movement of the first solenoid. The second solenoid may be locked into the position shown in FIG. 38 which impedes the movement of the first solenoid but does not require any energy to remain in place. Further, the second solenoid may be at any angle to the first solenoid. In addition, any stopping functionality may be utilized, such as, mechanical, magnetic, etc. In FIG. 39, a valve in an open position is shown. Please note that the second solenoid has moved to allow the first solenoid to move.

Figure 40B:
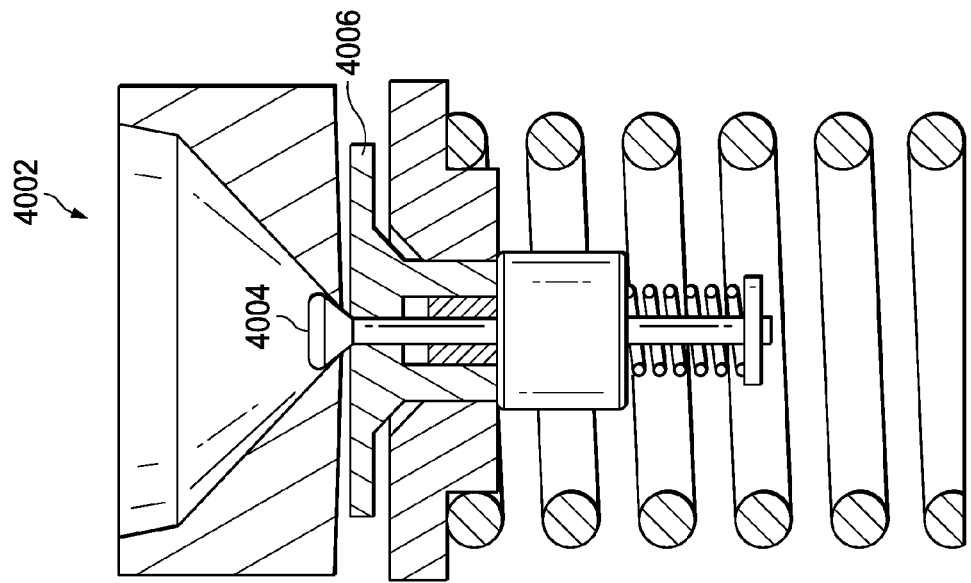
FIG. 40B is another illustration of a CF Valve, according to one embodiment.
Figure 40A:
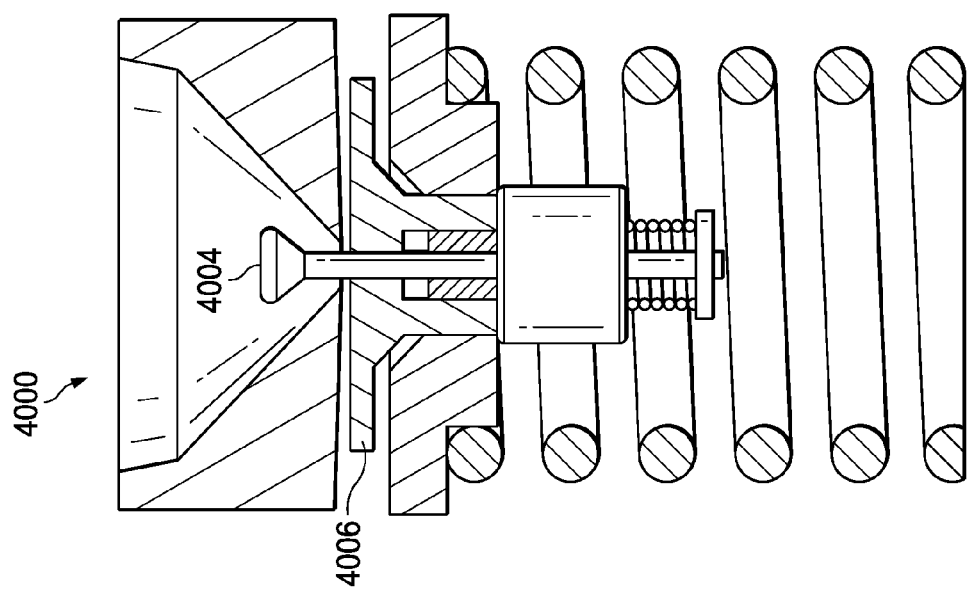
FIG. 40A is another illustration of a CF Valve, according to one embodiment.
Figure 40C:
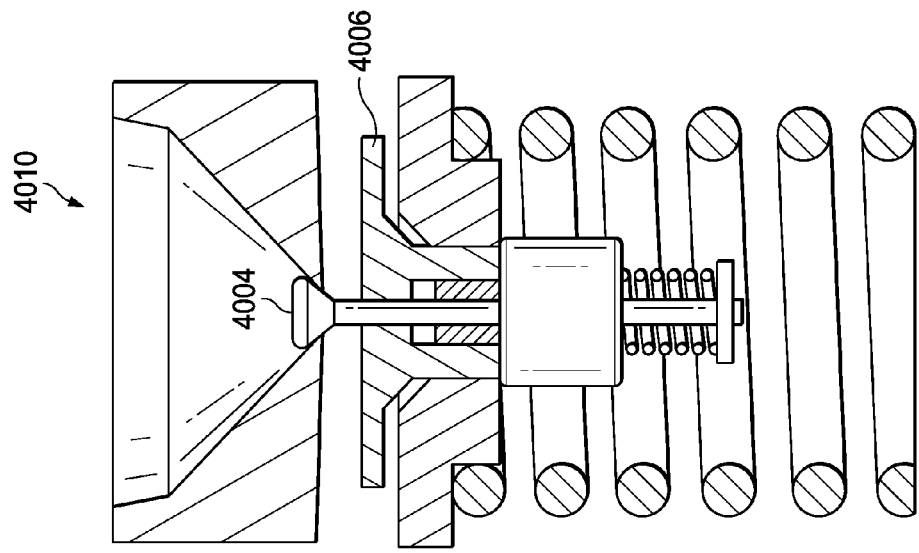
FIG. 40C is another illustration of a CF Valve, according to one embodiment.
Figure 40D:
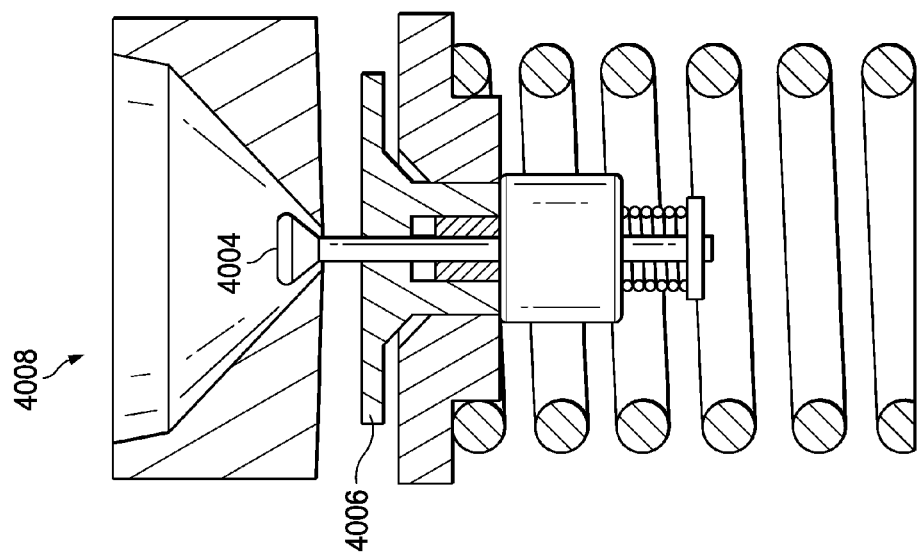
FIG. 40D is another illustration of a CF Valve, according to one embodiment.

In FIG. 40A, a solenoid in an open position and valve in a closed position are shown. In FIG. 40B, a solenoid in a closed position and valve in a closed position are shown. In FIG. 40C, a solenoid in an open position and valve in an open position are shown. In FIG. 40D, a solenoid in an open position and valve in an open position but closing are shown. In various examples, the movement functionality may be performed magnetically, mechanically, pneumatically, manually, and/or any combination thereof.

In one example, the dispensing device is a magnetically controlled valve using an internally disposed ball and an external magnetic source.

Figure 41:
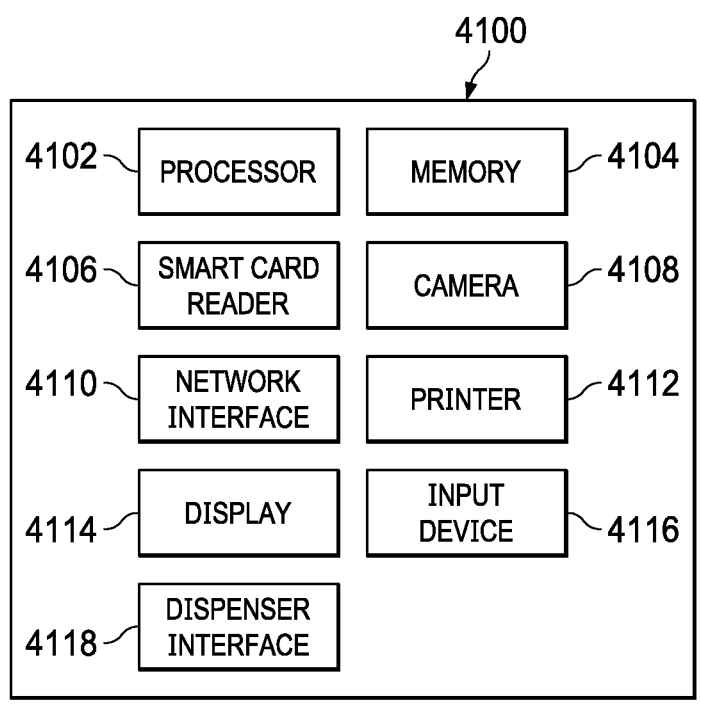
FIG. 41 is a block diagram, according to one embodiment.

In FIG. 41 a block diagram 4100 is shown, according to one embodiment. The block diagram 4100 includes a processor 4102, a memory 4104, a smart card reader 4106, a camera 4108, a network interface 4110, a printer 4112, a display 4114, an input device 4116, and a dispenser interface 4118. The memory 4104 may include one or more drink formulations, drink programs, maintenance data, client data, and/or any other information. The printer 4112 may generate one or more maintenance reports, usage reports, receipts, etc. The network interface 4110 may communicate with the Internet and/or the back office relating to anything in this disclosure. The dispenser interface 4118 may communicate with one or more dispensing units.

In one embodiment, a conduit may include a hollow element including an inner surface and an outer surface which allows for a passage of one or more of one or more fluid elements and one or more gaseous elements, a constraining element with one or more openings and one or more non-open elements, one or more blocking elements configured to stop the passage of the at least one of the one or more fluid elements and the one or more gaseous elements when the one or more blocking elements are in a first position relative to the one or more openings, and a movement device configured to move the one or more blocking elements to a second position relative to the one or more openings which allows for the passage of the one or more fluid elements and the one gaseous elements through the one or more openings in the constraining element.

In another example, the movement device is a magnetic coil. In another example, the movement device is an electronic magnetic. In another example, the fluid conduit is coupled to a dispensing unit. In another example, the fluid conduit is coupled to a multi-flavor dispensing unit. In another example, the conduit includes a valve which is coupled to the conduit. In another example, the valve is a CF valve.

In another embodiment, a dispensing system may include a dispensing unit including one or more flavor units and one or more water units where each of the one or more flavor units and the one or more water units include a transportation unit, the transportation unit including a barrier element with one or more openings, a blockage device configured to close the one or more openings to prevent a flow from at least one of the one or more flavor units and the one or more water units, a movement device configured to move the blockage device to a first position relative to the one or more openings which allows for a passage of one or more fluid elements and one gaseous elements through the one or more openings in the blockage device.

In another example, the at least one of the one or more water units is a carbonated unit. In another example, the movement device is a magnetic coil. In another example, the movement device is an electronic magnetic. In another example, the at least one of the one or more flavor units and the one or more water units are configured to be moveable. In another example, the at least one of the one or more flavor units and the one or more water units are configured to be automatically moveable.

In another embodiment, a method may include energizing one or more movement devices via one or more input devices based on the one or more input devices being in a first state, moving one or more blocking elements to a first position via the one or more movement devices when the one or more movement devices are in a first status which allows a flow to occur, de-energizing the one or more movement devices via the one or more input devices being in a second state; and/or moving the one or more blocking elements to a second position based on the one or more devices being in a second status, the movement of the one or more blocking elements stops the flow.

In another example, the one or more movement devices are magnetic coils. In another example, the one or more movement devices are coils electronic magnetics. In another example, the method may occur on a dispensing unit. In another example, the dispensing unit is a multi-flavor dispensing unit. In another example, the method may include a flow controller. In another example, the flow controller is a CF valve.

The disclosed embodiments are not considered limited to any particular magnetic materials, or orifice opening dimensions, Ball dimensions, Ball to orifice opening ratio, magnet location, electro magnet location or magnetic coil location, All locations, sizes, shapes, measurements, ratios, amounts, angles, component or part locations, configurations, dimensions, values, materials, orientations, etc. discussed above or shown in the drawings are merely by way of example and are not considered limiting and other locations, sizes, shapes, measurements, ratios, amounts, angles, component or part locations, configurations, dimensions, values, materials, orientations, etc. can be chosen and used and all are considered within the scope of the disclosure.

Dimensions of certain parts as shown in the drawings may have been modified and/or exaggerated for the purpose of clarity of illustration and are not considered limiting.

While the valve has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

Various examples of integrating the valve and the solenoid devices are shown in the following figures.

Figure 42A:
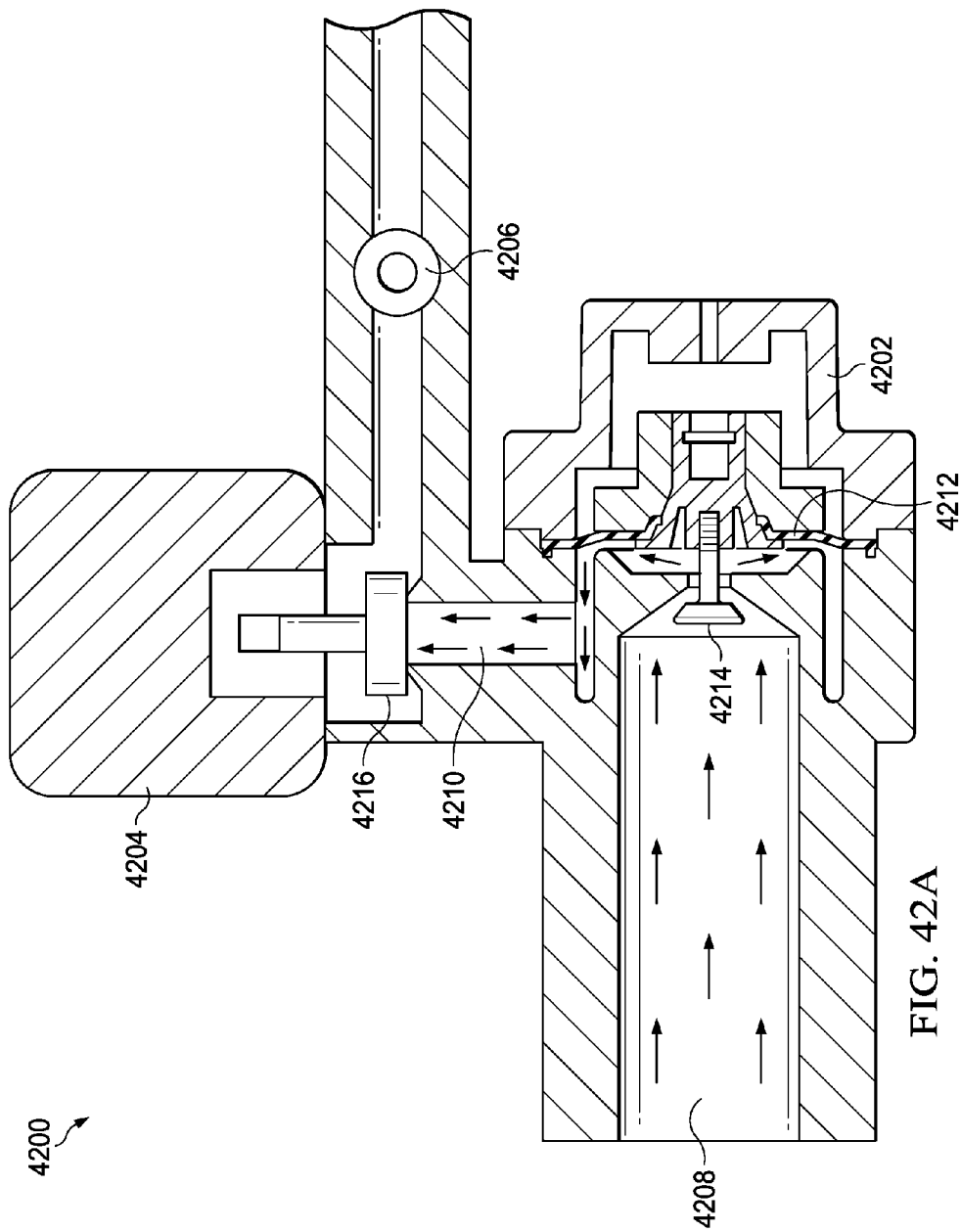
FIG. 42A is an illustration of a valve and solenoid combination, according to one embodiment.

In FIG. 42A, an illustration of a valve and solenoid combination is shown, according to one embodiment. A first valve and solenoid combination 4200 includes a valve 4202, a solenoid 4204, and an orifice 4206. The orifice 4206 may be fixed and/or adjustable. An inlet fluid stream 4208 may provide a first pressure and originate from any source (e.g., utility, condition source, etc.). The inlet fluid stream 4208 may pass a throttle pin 4214 of the valve 4202. In addition, the throttle pin 4214 and/or a diaphragm assembly 4212 may be part of the valve 4202. Further, the valve 4202 may be a CF Valve as previously disclosed in this document. An outlet fluid stream 4210 from the valve 4202 may be at a second pressure and/or fluid flow. Further, the second pressure and/or fluid flow may be a predetermined pressure and/or fluid flow. In addition, the second pressure and/or fluid flow may be a predetermined pressure and/or fluid flow based on the valve 4202 configuration. Further, the second pressure and/or flow fluid may be less than the first pressure of the inlet fluid stream 4208. In another example, the second pressure and/or flow fluid may be greater than the first pressure of the inlet fluid stream 4208. In this example, the outlet fluid stream 4210 is blocked (e.g., stopped) by a solenoid plunger 4216. In this example, the outlet fluid stream 4210 moves in one direction. In this example, the outlet fluid stream 4210 moves from left to right and is at a higher elevation than the inlet fluid stream 4208. It should be noted that all directions (e.g., left to right, right to left, right to up, right to down, left to up, left to down, left to up then right and then down and then left, etc.) and all elevations (e.g., stream one above stream two, stream one below stream two, stream one to the left of stream two and moving up, etc.) are within this disclosure's scope.

Figure 42B:
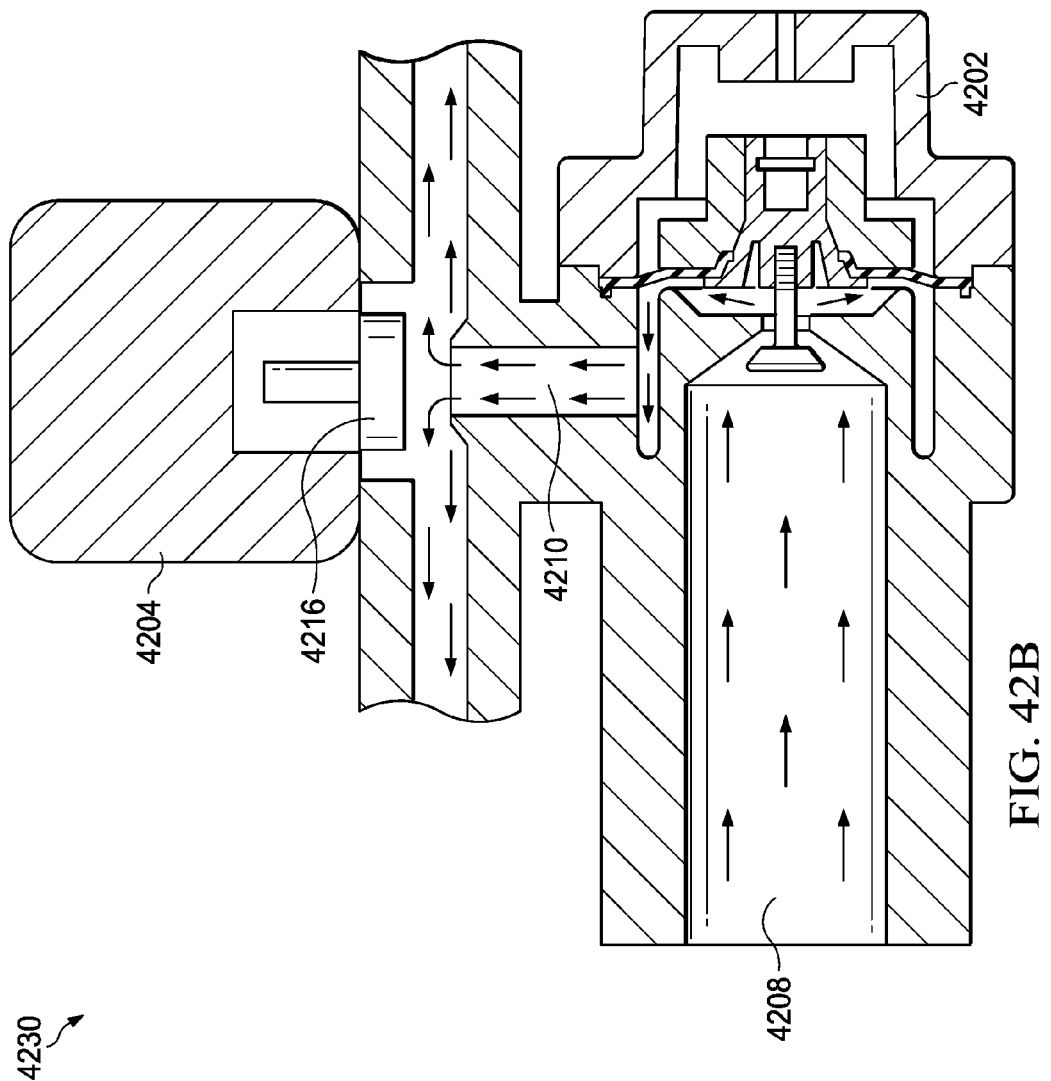
FIG. 42B is another illustration of a valve and solenoid combination, according to one embodiment.

In FIG. 42B, another illustration of a valve and solenoid combination is shown, according to one embodiment. A second valve and solenoid combination 4230 includes valve 4202 and solenoid 4204. The inlet fluid stream 4208 may provide a first pressure and originate from any source (e.g., utility, condition source, etc.). The inlet fluid stream 4208 may pass the throttle pin 4214 of the valve 4202. In addition, the throttle pin 4214 and/or the diaphragm assembly 4212 may be part of the valve 4202. Further, the valve 4202 may be a CF Valve as previously disclosed in this document. The outlet fluid stream 4210 from the valve 4202 may be at a second pressure and/or fluid flow. Further, the second pressure and/or fluid flow may be a predetermined pressure and/or fluid flow. In addition, the second pressure and/or fluid flow may be a predetermined pressure and/or fluid flow based on the valve 4202 configuration. Further, the second pressure and/or flow fluid may be less than the first pressure of the inlet fluid stream 4208. In another example, the second pressure and/or flow fluid may be greater than the first pressure of the inlet fluid stream 4208. In this example, the outlet fluid stream 4210 is not blocked (e.g., stopped) by the solenoid plunger 4216. In this example, the outlet fluid stream 4210 moves in two directions.

Figure 42C:
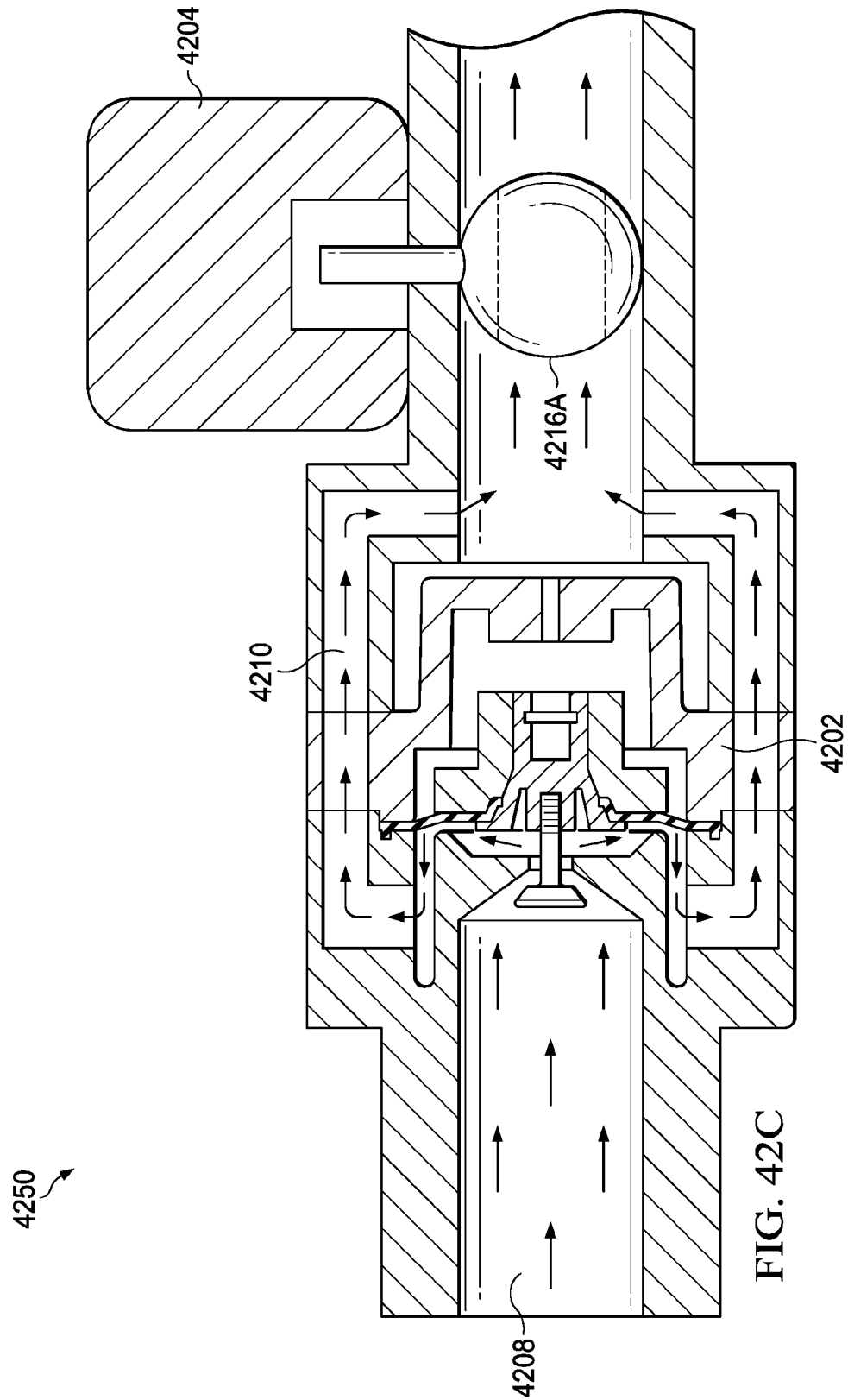
FIG. 42C is another illustration of a valve and solenoid combination, according to one embodiment.

In FIG. 42C, another illustration of a valve and solenoid combination is shown, according to one embodiment. A third valve and solenoid combination 4200 includes the valve 4202 and the solenoid 4204. The inlet fluid stream 4208 may provide a first pressure and originate from any source (e.g., utility, condition source, etc.). The inlet fluid stream 4208 may pass the throttle pin 4214 of the valve 4202. In addition, the throttle pin 4214 and/or the diaphragm assembly 4212 may be part of the valve 4202. Further, the valve 4202 may be a CF Valve as previously disclosed in this document. The outlet fluid stream 4210 from the valve 4202 may be at a second pressure and/or fluid flow. Further, the second pressure and/or fluid flow may be a predetermined pressure and/or fluid flow. In addition, the second pressure and/or fluid flow may be a predetermined pressure and/or fluid flow based on the valve 4202 configuration. Further, the second pressure and/or flow fluid may be less than the first pressure of the inlet fluid stream 4208. In another example, the second pressure and/or flow fluid may be greater than the first pressure of the inlet fluid stream 4208. In this example, the outlet fluid stream 4210 is not blocked (e.g., stopped) by a second solenoid plunger 4216A. In this example, the outlet fluid stream 4210 moves in one direction.

Figure 42D:
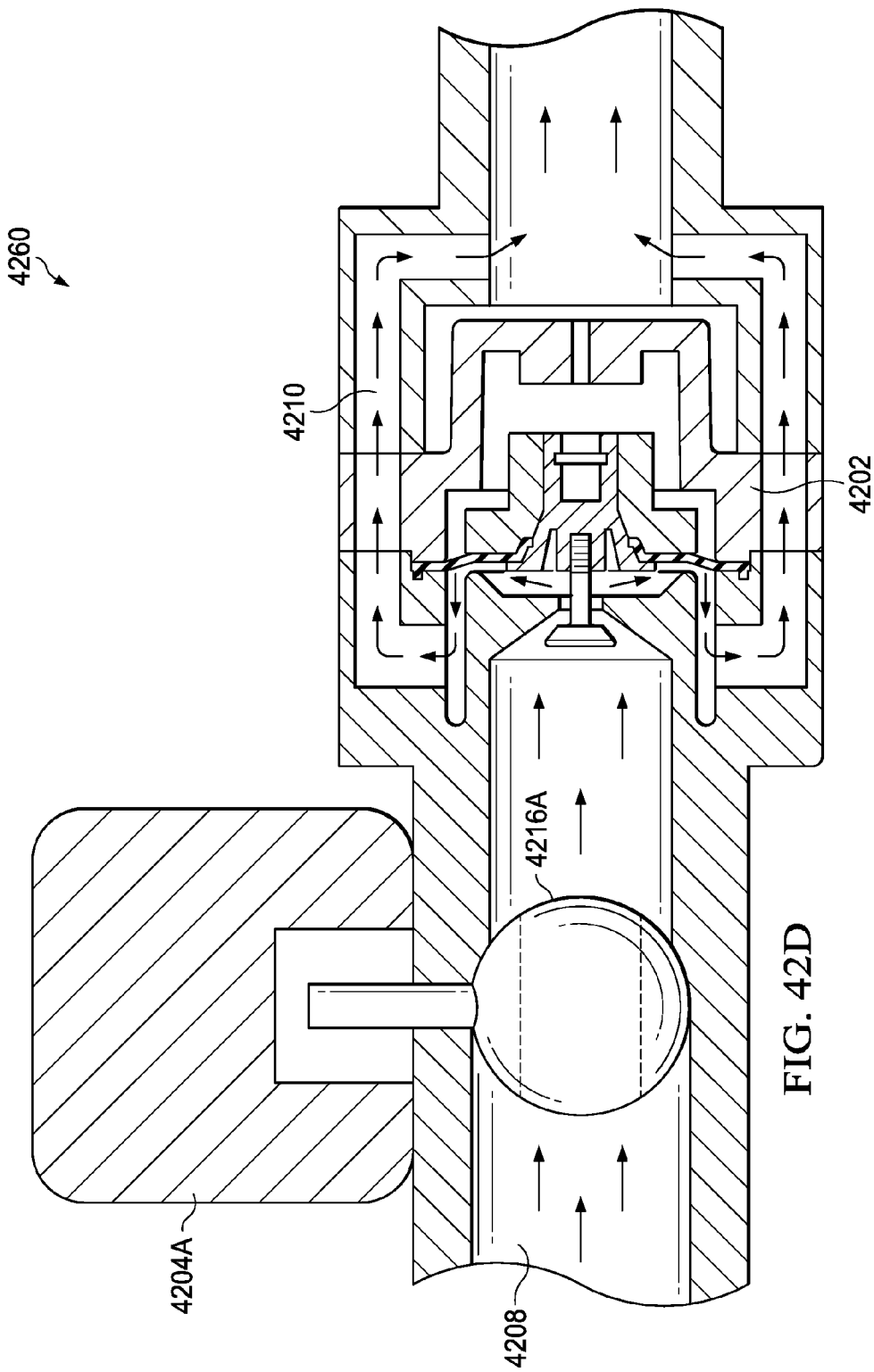
FIG. 42D is another illustration of a valve and solenoid combination, according to one embodiment.

In FIG. 42D, another illustration of a valve and solenoid combination is shown, according to one embodiment. A fourth valve and solenoid combination 4200 includes the valve 4202 and a second solenoid 4204A. The inlet fluid stream 4208 may provide a first pressure and originate from any source (e.g., utility, condition source, etc.). The inlet fluid stream 4208 may pass the second solenoid 4204A and the throttle pin 4214 of the valve 4202. In this example, the second solenoid 4204A is larger than the solenoid 4204 because the inlet fluid stream 4208 is at a first pressure which is higher than a second pressure of the outlet fluid stream 4210. This is because the second solenoid 4204A has been placed before the valve 4202. The valve 4202 would have reduced the pressure from a first pressure to a second pressure to decrease the size requirements of the solenoid (e.g., solenoid 4204). However, since the pressure was not reduced the solenoid must be bigger to handle the increased pressure (therefore the second solenoid 4204A is bigger than the solenoid 4204). In addition, the throttle pin 4214 and/or the diaphragm assembly 4212 may be part of the valve 4202. Further, the valve 4202 may be a CF Valve as previously disclosed in this document. The outlet fluid stream 4210 from the valve 4202 may be at a second pressure and/or fluid flow. Further, the second pressure and/or fluid flow may be a predetermined pressure and/or fluid flow. In addition, the second pressure and/or fluid flow may be a predetermined pressure and/or fluid flow based on the valve 4202 configuration. Further, the second pressure and/or flow fluid may be less than the first pressure of the inlet fluid stream 4208. In another example, the second pressure and/or flow fluid may be greater than the first pressure of the inlet fluid stream 4208. In this example, the outlet fluid stream 4210 moves in two directions.

Figure 43:
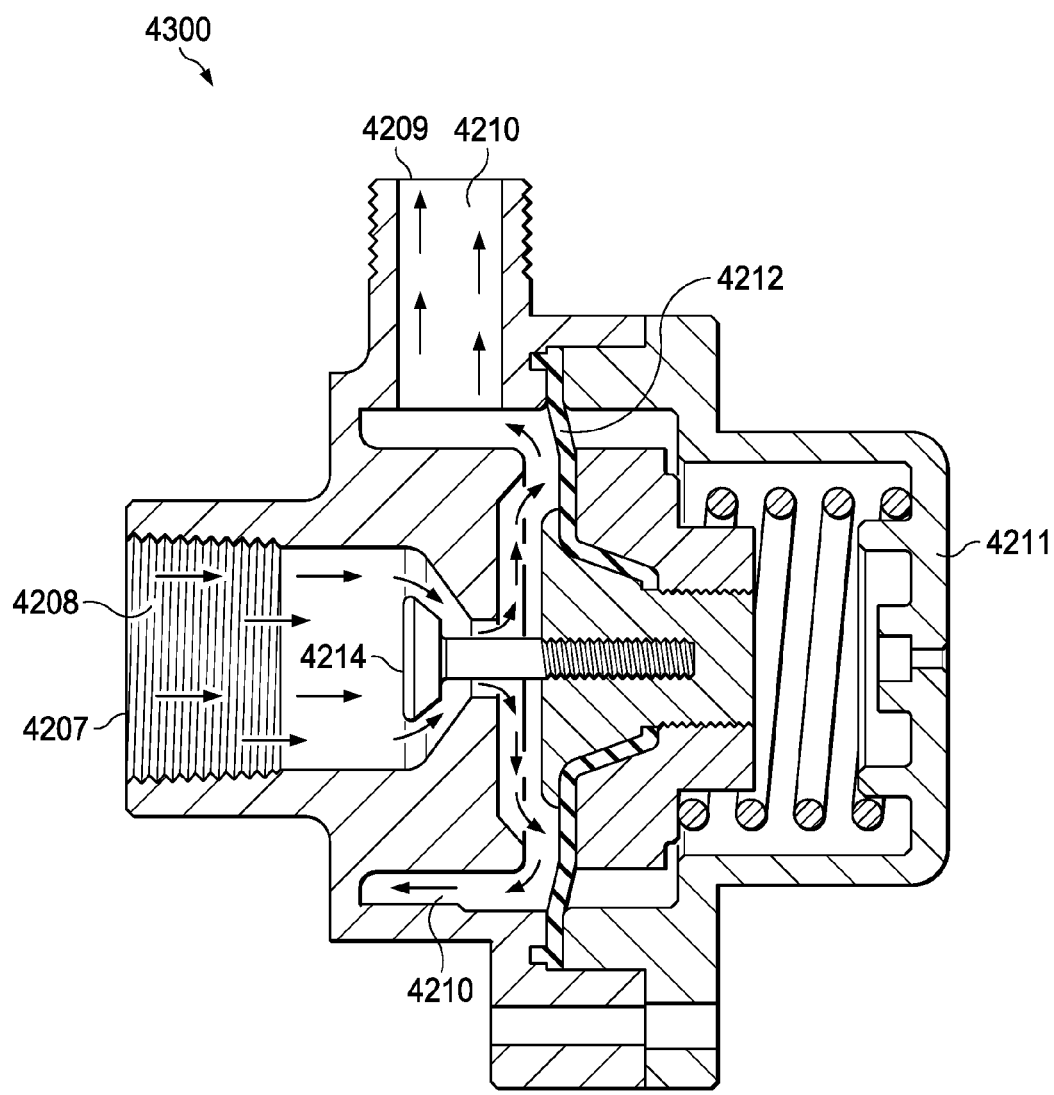
FIG. 43 is an illustration of a valve, according to one embodiment.

In FIG. 43, an illustration of a valve is shown, according to one embodiment. A valve 4300 may include the diaphragm assembly 4212, the throttle pin 4214, an inlet area 4207, an outlet area 4209, and a spring cup 4211. The inlet fluid stream 4208 may pass the throttle pin 4214 of the valve 4202. In addition, the throttle pin 4214 and/or the diaphragm assembly 4212 may be part of the valve 4202. Further, the valve 4202 may be a CF Valve as previously disclosed in this document. The outlet fluid stream 4210 from the valve 4202 may be at a second pressure and/or fluid flow. Further, the second pressure and/or fluid flow may be a predetermined pressure and/or fluid flow. In addition, the second pressure and/or fluid flow may be a predetermined pressure and/or fluid flow based on the valve 4202 configuration. Further, the second pressure and/or flow fluid may be less than the first pressure of the inlet fluid stream 4208.

Figure 44:
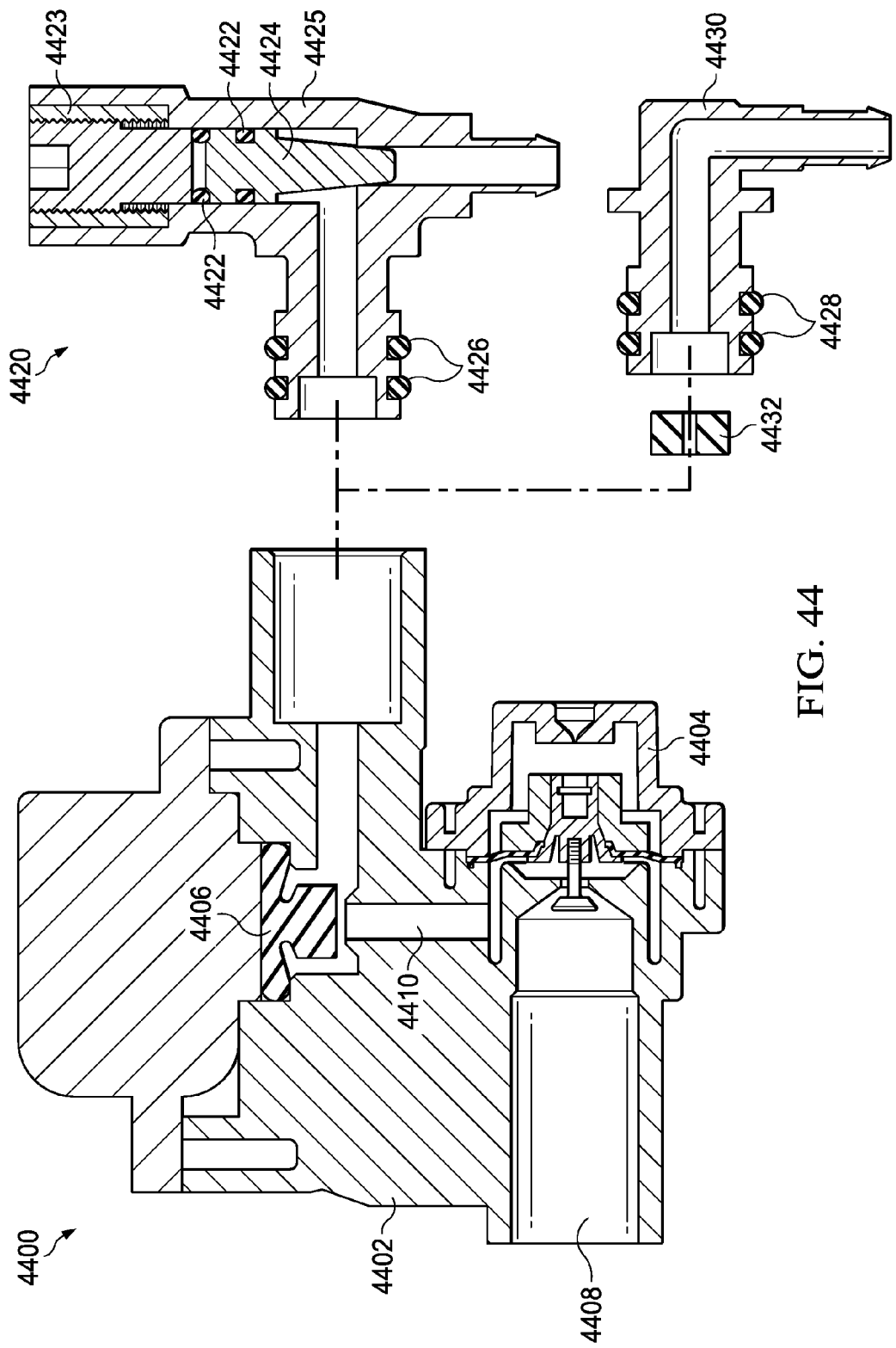
FIG. 44 is an illustration of a valve and solenoid combination, according to one embodiment.

In FIG. 44, an illustration of a valve and solenoid combination is shown, according to one embodiment. A fifth valve and solenoid combination 4400 includes a body 4402 (e.g., CFiV body), a fluid passageway 4408, a valve 4404, an outlet stream area 4410, and a solenoid 4406. In this example, the fifth valve and solenoid combination 4400 is compact, allows for a smaller solenoid, is cheaper, and more efficient. Further, a needle valve 4420 includes a needle valve insert 4423, one or more needle valve pin seals 4422 (e.g., O-Rings), a needle valve pin 4424, a needle valve body 4425, and/or one or more needle valve body seals 4426 (e.g., O-Rings). In addition, an elbow 4430 may include one or more elbow seals 4428 (e.g., O-Rings) and be connected to an orifice 4432 (e.g., CFiV Orifice).

Figure 45:
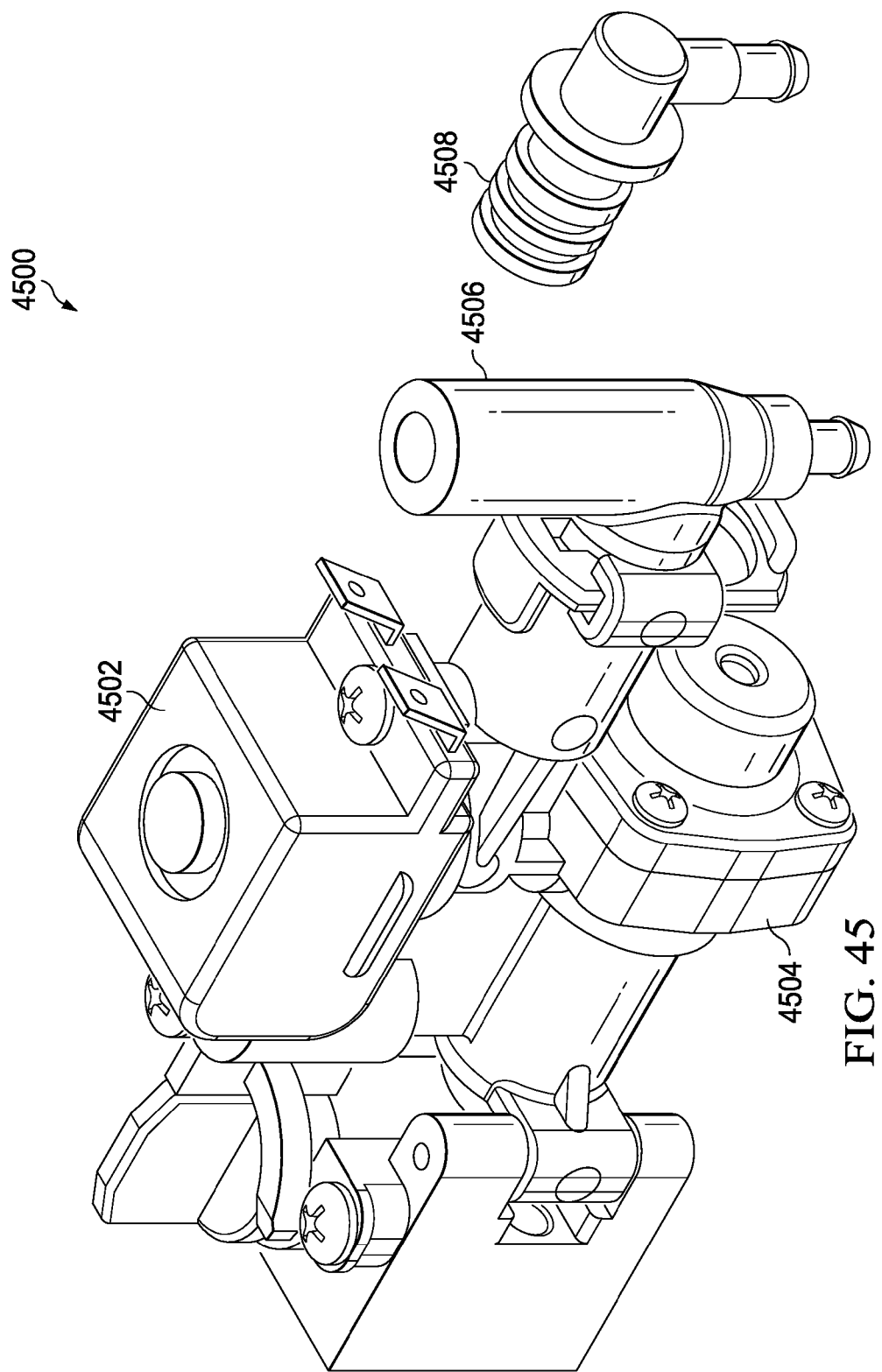
FIG. 45 is an illustration of a valve and solenoid combination, according to one embodiment.

In FIG. 45, an illustration of a valve and solenoid combination is shown, according to one embodiment. A sixth valve and solenoid combination 4500 may include a solenoid 4502, a valve 4504 (e.g., CF Valve), a, needle valve pin 4506, and/or an elbow 4508.

In one embodiment, a dispensing device includes a valve configured to interact with an inlet stream where the inlet stream has a first pressure. The valve has an outlet area with an outlet stream where the outlet stream has a second pressure. The dispensing device including a solenoid configured to interact with the outlet stream.

In another example, the inlet stream and/or the outlet stream is a carbonated water. In another example, the first pressure is greater than the second pressure. In another example, a size of the solenoid is reduced based on a reduction in pressure from the first pressure to the second pressure. In another example, a size of the solenoid is reduced based on the valve. In another example, the inlet stream is a utility line. In another example, the dispensing device includes an orifice. In another example, the orifice is fixed. In another example, the orifice is adjustable. In another example, the valve is a CFValve.

In another example, the CFValve is a regulating valve for maintaining a substantially constant flow of fluid from a variable pressure fluid supply to a fluid outlet, the CFValve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported (in on example, the supporting is exclusively done—in other examples, the supporting is not done exclusively) by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by (in on example, the accommodating is resiliently done—in other examples, the accommodating is not done resiliently) accommodating movement of the diaphragm away from the inner side of the barrier wall, with the valve head on the stem being (in on example, the movement is correspondingly done—in other examples, the movement is not done correspondingly) moved to adjust the size of the control orifice, thereby maintaining a (in on example, the constant flow is substantially done—in other examples, the constant flow is not done substantially) constant flow of fluid from the inlet port through the first and second passageways to the outlet port for delivery to the fluid outlet.

In another example, the dispensing device includes: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

In another example, the dispensing device includes a carbonated unit. In another example, the movement device is a magnet. In another example, the movement device is an electro-magnet. In another example, at least one of the one or more flavor units is configured to be selectable. In another example, at least one of the one or more flavor units is configured to be automatically selectable As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. Any combination of any element in this disclosure with any other element in this disclosure is hereby disclosed.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A dispensing device with a housing, the housing comprising:
  a CF valve configured to interact with an inlet stream, the inlet stream having a first pressure, the valve having an outlet area with an outlet stream, the outlet stream having a second pressure;
  a solenoid configured to interact with the outlet stream; and
  wherein the CF Valve is configured to maintain a relative constant flow of fluid from a variable pressure fluid supply to a fluid outlet, the CF Valve including: a) a valve housing having an inlet port and an outlet port aligned in an axial manner and adapted to be connected to the variable pressure fluid supply and the fluid outlet; b) a diaphragm chamber interposed between the inlet port and the outlet port, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port circular rim surrounding an open mouth facing the inner side of the barrier wall, the cylindrical side wall and the bottom wall of the cup being spaced in an inward direction from adjacent interior surfaces of the valve housing to define a second passageway connecting the diaphragm chamber to the outlet port; d) a resilient disc-shaped diaphragm closing the open mouth of the cup, the resilient disc-shaped diaphragm being supported by the circular rim and having a peripheral flange overlapping the cylindrical side wall; e) a piston assembly secured to a center of the resilient disc-shaped diaphragm, the piston assembly having a cap on one side of the resilient disc-shaped diaphragm facing the inner side of the barrier wall, and a base suspended from an opposite side of the resilient disc-shaped diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for urging in a resilient manner the resilient disc-shaped diaphragm into a closed position against the inner side of the barrier wall to thereby prevent fluid flow from the inlet port via the first passageway into the diaphragm chamber, the spring device being responsive to fluid pressure above a predetermined level applied to the resilient disc-shaped diaphragm via the inlet port and the first passageway by accommodating movement of the resilient disc-shaped diaphragm away from the inner side of the barrier wall, with the valve head on the stem being moved to adjust a size of the control orifice, thereby maintaining the relative constant flow of fluid from the inlet port through the first passageway and the second passageway to the outlet port for delivery to the fluid outlet.

2. The dispensing device of claim 1, wherein at east one of the inlet stream and the outlet stream is a carbonated water.

3. The dispensing device of claim 1, wherein the first pressure is greater than the second pressure.

4. The dispensing device of claim 1, wherein the inlet stream is a utility line.

5. The dispensing device of claim 1, further comprising an orifice coupled to at least one of the solenoid, and the CF Valve.

6. The dispensing device of claim 5, wherein the orifice is fixed.

7. The dispensing device of claim 5, wherein the orifice is adjustable.

8. The dispensing device of claim 1, wherein the valve is a CF Valve.

9. The dispensing device of claim 1, wherein the housing further comprises a solenoid plunger.

10. The dispensing device of claim 9, wherein the solenoid plunger is located between the valve and the solenoid.

11. The dispensing device of claim 1, wherein the inlet stream and the outlet stream are in a serial position relative to each other.

\* \* \* \* \*